(12) United States Patent
Sakamoto et al.

(10) Patent No.: US 7,150,698 B2
(45) Date of Patent: Dec. 19, 2006

(54) POWER TRANSMISSION APPARATUS FOR AUTOMOBILE

(75) Inventors: Hiroshi Sakamoto, Hitachi (JP); Toshimichi Minowa, Mito (JP); Takashi Okada, Hitachi (JP); Mitsuo Kayano, Hitachi (JP); Tatsuya Ochi, Hitachi (JP); Hiroshi Kuroiwa, Hitachi (JP); Masahiko Ibamoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/084,385

(22) Filed: Feb. 28, 2002

(65) Prior Publication Data

US 2002/0189397 A1 Dec. 19, 2002

(30) Foreign Application Priority Data

Jun. 19, 2001 (JP) ............................. 2001-184205

(51) Int. Cl.
*B60W 10/02* (2006.01)

(52) U.S. Cl. ........................... 477/5; 477/6; 192/48.91; 74/661; 74/665 A; 74/665 B; 74/329; 180/65.2; 180/65.4; 180/65.6; 180/65.7; 180/65.8

(58) Field of Classification Search ............. 192/53.34, 192/48.91; 477/5, 6; 74/665 A, 665 B, 74/329, 661; 180/65.2, 65.4, 65.6, 65.7, 180/65.8; 475/5
See application file for complete search history.

(56) References Cited

U.S. PATENT DOCUMENTS

| 5,730,676 | A | * | 3/1998 | Schmidt | ..................... 475/5 |
| 5,935,035 | A | * | 8/1999 | Schmidt | ..................... 475/5 |
| 6,142,907 | A | * | 11/2000 | Minowa et al. | ................. 477/5 |
| 6,371,878 | B1 | * | 4/2002 | Bowen | ..................... 475/5 |
| 6,558,283 | B1 | * | 5/2003 | Schnelle | ..................... 475/5 |
| 6,612,386 | B1 | * | 9/2003 | Tamai et al. | ............... 180/65.4 |
| 6,634,247 | B1 | * | 10/2003 | Pels et al. | ...................... 74/329 |
| 6,712,734 | B1 | * | 3/2004 | Loeffler | ..................... 477/5 |
| 2002/0179347 | A1 | * | 12/2002 | Tamai et al. | ............... 180/65.2 |

FOREIGN PATENT DOCUMENTS

| DE | 19850549 A1 | | 5/2000 |
| JP | 11069509 A | | 3/1999 |
| JP | 11141665 A | | 5/1999 |
| JP | 11-313404 | | 11/1999 |
| JP | 2000245010 A | | 9/2000 |
| WO | WO 00/26053 | * | 5/2000 |
| WO | WO 00/26559 | * | 5/2000 |
| WO | WO 00/32433 | * | 6/2000 |

* cited by examiner

*Primary Examiner*—Charles A. Marmor
*Assistant Examiner*—David D. Le
(74) *Attorney, Agent, or Firm*—Crowell & Moring LLP

(57) ABSTRACT

In a control unit for an automobile power transmission apparatus which includes a gear-type transmission and several of the motors are controlled so as to suppress thrust or push-up on the torque of the output shaft of the transmission due to inertia torque or to suppress draw or pull-in on the output shaft.

6 Claims, 19 Drawing Sheets

TORQUE TRANSMISSION ROUTE FROM 1st MOTOR : ———
TORQUE TRANSMISSION ROUTE FROM 2nd MOTOR : ----------

ENGINE RUNNING : ———

POWER GENERATION ON 1st MOTOR : ----------
BY PART OF ENGINE POWER

POWER GENERATION ON 2nd MOTOR : —·—
BY PART OF ENGINE POWER

TORQUE TRANSMISSION ROUTE WHEN CHARGING : ―――――

TORQUE TRANSMISSION ROUTE WHEN MOTOR RUNNING : -------------

ENGINE RUNNING : ———
ACCELERATION ASSIST BY 1st MOTOR : ----------
ACCELERATION ASSIST BY 2nd MOTOR : —·—·—

ENGINE RUNNING : ———
POWER GENERATION ON 2nd MOTOR
BY PART OF ENGINE POWER : ----------
ACCELERATION ASSIST BY 1st MOTOR : —·—·—

ENGINE RUNNING : ———
POWER GENERATION ON 2nd MOTOR
BY PART OF ENGINE POWER : ----------
ACCELERATION ASSIST BY 1st MOTOR : —·—·—

TORQUE TRANSMISSION : ------------
ROUTE WHEN 1st SPEED

TORQUE TRANSMISSION : ——————
ROUTE WHEN 2nd SPEED

TORQUE TRANSMISSION : —·—·—·
ROUTE OF 2nd MOTOR

TORQUE TRANSMISSION
ROUTE WHEN 3rd SPEED  : ————

TORQUE TRANSMISSION
ROUTE WHEN 5th SPEED  : ------------

TORQUE TRANSMISSION ROUTE FROM 1st MOTOR: ———

TORQUE TRANSMISSION ROUTE FROM 2nd MOTOR: -----------

POWER TRANSMISSION APPARATUS FOR AUTOMOBILE

BACKGROUND OF THE INVENTION

The present invention relates to the structure of a motive power transmission system, comprising an engine, electric motors and a gear-type transmission therein, and in particular, relates to a power transmission apparatus for obtaining both reduction of fuel efficiency (or mileage) and drivability through small-sizing and weight-lightening of the motive power transmission system.

Such the power transmission apparatus, according to the conventional art, for achieving an improvement of transmission efficiency in the motive power transmission system, as well as, the drivability thereof, is already known and described in Japanese Patent Laying-Open No. Hei 11-313404 (1999), for example.

In this publication is described the power transmission apparatus for use in an automobile, in which an input shaft of the gear-type transmission is connected to an electric power generator or alternator while an output shaft thereof is connected to an electric motor(s). With such the transmission apparatus, since various driving modes can be realized or achieved through the integrity control of the engine, the alternator, the electric motor(s), and the gear-type transmission, then it is possible to achieve the reduction in the fuel efficiency. And, compensation or adjustment is also possible for a drop in the driving power when changing over the gear trains by means of the motor(s) mentioned above, in particular, when conducting the gearshift by exchanging the gear trains through a claw clutch, and therefore, it is possible to obtain an improvement in the drivability.

For such the power transmission apparatus, it is necessary to control the engine, the electric motor(s) and the alternator, integrally, so that the engine and the electric motor(s)operate within a region of high efficiency thereof, while keeping a driver satisfy with a feeling of acceleration or deceleration that she/he requires, thereby obtaining the reduction of fuel efficiency. For that purpose, the electric motor(s) is/are connected to the output shaft of the gear-type transmission, thereby being so constructed that the reduction of driving power during the gear-shifting is adjusted by means of the electric motor(s) mentioned above.

However, with such the structure of the transmission apparatus as mentioned above, since required torque of the electric motor(s) is large during the gear-shifting, it is impossible for the electric motor(s) to escape from becoming large in the sizes thereof, and therefore it is difficult to reduce the fuel efficiency or mileage.

SUMMARY OF THE INVENTION

Therefore, according to the present invention, by taking the above into the consideration, an object is to provide a control unit for a motive power transmission apparatus, with which various driving modes can be achieved and the electric motor can be made small in the sizes, and thereby both the reduction of the mileage or fuel efficiency and the drivability can be obtained, by small-sizing and weight-lightening of the power transmission apparatus for use in an automobile.

For achieving such the object as mentioned above, according to the present invention, there is provided a control unit for a power transmission apparatus used in an automobile comprising: (a) an engine; a gear-type transmission having: (b1) a first input shaft to which motive power is transmitted from said engine through a first friction clutch; (b2) a second input shaft to which motive power is transmitted from said engine through a second friction clutch; (b3) plural numbers of gear trains provided between said first input shaft and an output shaft and between said second input shaft and said output shaft; and (b4) a claw clutch provided on said gear trains; (c) a first motor connected to said first input shaft; and (d) a second motor connected to said second input shaft, wherein the control unit permits either one of said first motor or said second motor to be driven so that reduction of torque on said output shaft is compensated, when conducting gear-shift through change-over of said gear trains by means of said claw clutch.

Also, according to the present invention, there is provided a power transmission apparatus for use in an automobile, comprising: (a) an engine; a gear-type transmission having: (b1) a first input shaft to which motive power is transmitted from said engine through a first friction clutch; (b2) a second input shaft to which motive power is transmitted from said engine through a second friction clutch; (b3) plural numbers of gear trains provided between said first input shaft and an output shaft and between said second input shaft and said output shaft; and (b4) a claw clutch provided on said gear trains; (c) a first motor connected to said first input shaft; and (d) a second motor connected to said second input shaft, wherein either one of said first motor or said second motor is driven so that torque fluctuation on said output shaft is suppressed, when conducting gear-shift through change-over between said first friction clutch and said second friction clutch.

Preferably, according to the present invention, in the power transmission apparatus, as described in the above, wherein either one of said first motor or said second motor is driven so that wear-out of said claw clutch is suppressed by controlling either one of said first input shaft or said second input shaft, when conducting gear-shift through change-over of said gear trains by means of said claw clutch.

DETAILED DESCRIPTION OF THE PREFERRED EMBODIMENTS

Hereinafter, embodiments according to the present invention will be fully explained by referring to the attached drawings.

Figure 1:
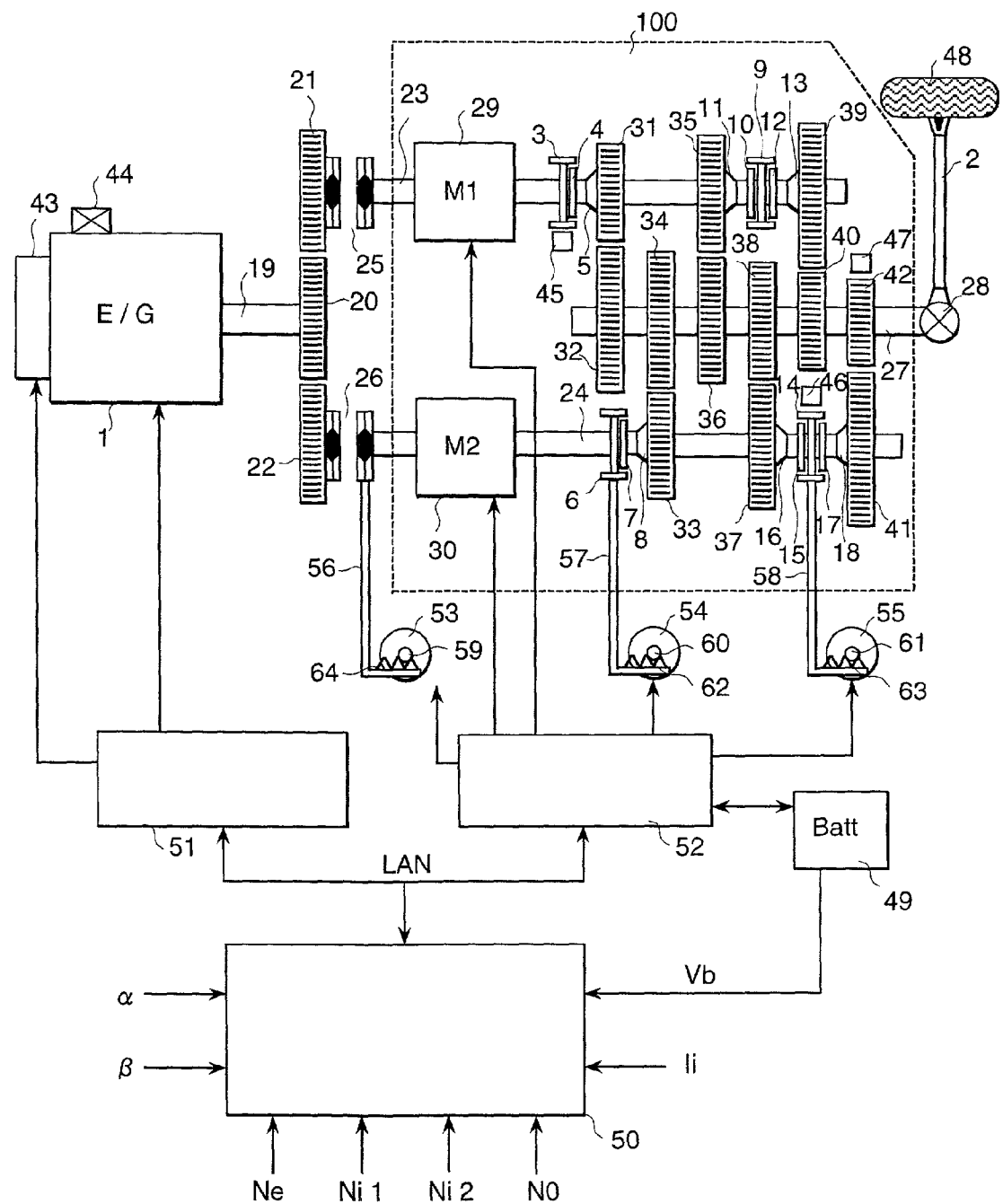
FIG. 1 shows the structure of an automobile system, according to one embodiment of the present invention.

FIG. 1 shows the structure of an automobile system, according to an embodiment of the present invention.

Within an engine 1, an amount of suction air is controlled by means of an electronic control throttle 43 provided in a suction tube or conduit (not shown in the figure), and an amount of fuel fitting to the air amount is injected from a fuel injector(s) (not shown in the figure). Also, ignition timing is determined upon basis of signals, such as, an air-fuel ratio, which is determined by the amounts of air and fuel mentioned above, and an engine rotating speed Ne, which is measured from an engine rotating speed sensor 44, thereby the ignition is conducted by means of an ignition apparatus (not shown in the figure). As the fuel injection apparatus, there is one of an intake port injection method, in which the fuel is injected into an air intake port, or of a cylinder injection method of injecting the fuel directly into the cylinder, however it is preferable to select an engine of the method, with which the fuel efficiency or mileage can be reduced with comparing a driving area required for the engine (thus, the area determined by the engine torque and the engine rotating speed), and being superior in an exhaust performance thereof.

A gear 20 is attached to an engine output shaft 19, so as to be rotated as one body with the engine output shaft 19, and gears 21 and 22 are always engaged or meshed with the gear 20, respectively. Herein, gear ratio of each of the gear trains (i.e., between the gears 20 and 21 and between the gears 20 and 22) is assumed to be one (1). Also, between the engine output shaft 19 mentioned above and a first input shaft 23 of a gear-type transmission 100, a first friction clutch 25 is provided for allowing the motive power of the engine 1 to be transmitted to the first input shaft 23. With using a clutch of wet multi-plate type as the first friction clutch 25, and also an actuator being driven by oil pressure or an electric motor or the like, for controlling pressing force upon the first friction clutch 25, thereby to adjust the pressing force upon the first friction clutch 25, it is possible to adjust the torque transmitted from the engine output shaft 19 to the first input shaft 23. In the similar manner, a second friction clutch 26 is provided between the engine output shaft 19 and a second input shaft 24 of the gear-type transmission 100, thereby enabling to transmit the motive power of the engine 1 to the second input shaft 24. With using such a clutch of wet multi-plate type as the second friction clutch 26, and also an actuator being driven by oil pressure or an electric motor or the like, for controlling pressing force upon the second friction clutch 26, thereby to adjusting the pressing force upon the second friction clutch 26, it is also possible to adjust the torque transmitted from the engine output shaft 19 to the second input shaft 24. However, as the first friction clutch 25 and the second friction clutch 26 mentioned above, it is possible to adopt all other friction clutches, such as, a clutch of a dry single-plate type, or a clutch of dry multi-plate type, or an electromagnetic clutch, etc., than the wet multi-plate type mentioned above, and in particular, when applying the electromagnetic clutch mentioned above, an actuator being driven by electromagnetic force is used to control the pressing force upon the clutch.

Onto the first input shaft 23 mentioned above are attached or mounted a first motor 29, a gear 31 equipped with a contact gear 5 and a synchronizer 4, a gear 35 equipped with a contact gear 11 and a synchronizer 10, a gear 39 equipped with a contact gear 13 and a synchronizer 12, a hub sleeve 3 directly connecting between the first input shaft 23 and the gear 31, and a hub sleeve 9 directly connecting between the first input shaft 23 and the gear 35 or 39, being freely rotatable to the first input shaft 23. Onto the gears 31, 35 and 39 are provided stoppers (not shown in the figure), for preventing them from shifting in an axial direction of the first input shaft 23. And, in an inside of the hub sleeve 3 and 9 are formed gutters (not shown in the figure) to be meshed with plural numbers of gutters (not shown in the figure) of the first input shaft 23 mentioned above, so that the hub sleeves 3 and 9 are engaged with the first input shaft 23, being allowed to make a relative movement in the axial direction of the first input shaft 23, but restricted from a movement in the rotational direction thereof. Accordingly, the torque on the first input shaft 23 is transmitted to the above-mentioned hub sleeves 3 and 9.

For transmitting the torque from the hub sleeve 3 to the gear 31, it is necessary to move the hub sleeve 3 mentioned above in the axial direction of the first input shaft 23, thereby to connect the hub sleeve 3 with the gear 31, directly, through the synchronizer 4 and the contact gear 5. In the similar manner, for transmitting the torque from the above-mentioned hub sleeve 9 to the gear 35 or 39, it is necessary to move the hub sleeve 3 in the axial direction of the first input shaft 23, so as to connect the hub sleeve 9 with the gear 35 or 39, directly, through the synchronizer 10 and the contact gear 11, or through the synchronizer 12 and the contact gear 13. For the movement of the above hub sleeves 3 and 9, an actuator is used, which is driven by oil pressure or an electric motor. The hub sleeve 3 mentioned above can be utilized as a detector of the rotating speed "Ni1" of the first input shaft 23, thereby enabling the detection of the rotating speed of the first input shaft 23 by detecting the rotation of the hub sleeve 3 through a sensor 45.

Onto the second input shaft 24 mentioned above are attached or mounted a second motor 30, a gear 33 equipped with a contact gear 8 and a synchronizer 7, a gear 37 equipped with a contact gear 16 and a synchronizer 15, a gear 41 equipped with a contact gear 18 and a synchronizer 17, a hub sleeve 6 directly connecting between the second input shaft 24 and the gear 33, and a hub sleeve 14 directly connecting between the second input shaft 24 and the gear 37 or 41, being freely rotatable to the second input shaft 24. Onto the gears 33, 37 and 41 are provided stoppers (not shown in the figure), for preventing them from shifting in an axial direction of the second input shaft 24. And, in an inside of the hub sleeve 6 and 14 are formed gutters (not shown in the figure) to be meshed with plural numbers of gutters (not shown in the figure) of the second input shaft 24 mentioned above, so that the hub sleeves 6 and 14 are engaged with the second input shaft 24, being allowed to make a relative movement in the axial direction of the second input shaft 24, but restricted from a movement in the rotational direction thereof. Accordingly, the torque on the second input shaft 24 is transmitted to the above-mentioned hub sleeves 6 and 14.

For transmitting the torque from the hub sleeve 6 to the gear 33, it is necessary to move the hub sleeve 6 mentioned above in the axial direction of the second input shaft 24, so as to connect the hub sleeve 6 with the gear 33, directly, through the synchronizer 7 and the contact gear 8. In the similar manner, for transmitting the torque from the above-mentioned hub sleeve 14 to the gear 37 or 41, it is necessary to move the hub sleeve 14 in the axial direction of the second input shaft 24, so as to connect the hub sleeve 14 to the gear 37 or 41, directly, through the synchronizer 15 and the contact gear 16, or through the synchronizer 17 and the contact gear 18. For the movement of the above hub sleeves 6 and 14, an actuator is used, which is driven by oil pressure or an electric motor. The hub sleeve 14 mentioned above can be also utilized as a detector of the rotating speed Ni2 of the second input shaft 24, thereby enabling the detection of the rotating speed of the second input shaft 24 by detecting the rotation of the hub sleeve 14 through a sensor 46.

The claw clutch mechanism, comprising: such the hub sleeve, the contact gear and the synchronizer, as well as, functioning as: a torque transmission means, is called by a dog clutch, herein, and these mechanisms enable the transmission of the torques on the first input shaft 23 and the second input shaft 24 to the output shaft 27 with high efficiency, thereby assisting in reduction of the fuel efficiency.

Onto the output shaft 27 mentioned above are attached or mounted gears 32, 34, 36, and 38, and also gears 40 and 42, so as to be rotated together with the output shaft 27 in one body, and those gears are always meshed with the gears 31, 33, 35 and 37, and also gears 37, 39 and 41, respectively. The gear 42 mentioned above is also used as a detector of the rotating speed "No" of the output shaft 27, therefore detection of the rotation of the gear 42 by a sensor 47 allows the detection of the rotating speed of the output shaft 27. Also, to the output shaft 27 mentioned above is connected a differential apparatus 28, therefore the torque on the output shaft 27 is transmitted up to wheels or tires 48 through the differential apparatus 28 and a vehicle driving axis 2.

In the embodiment of the present invention shown in the FIG. 1, the gear train made up between the gears 31 and 32 is the first ($1^{st}$) speed, between the gears 33 and 34 the second ($2^{nd}$) speed, between the gears 35 and 36 the third ($3^{rd}$) speed, between the gears 33 and 34 the fourth ($4^{th}$) speed, between the gears 39 and 40 the fifth ($5^{th}$) speed, and between the gears 41 and 42 the sixth ($6^{th}$) speed, respectively, on the steps of the transmission.

Also, in the embodiment of the present invention shown in the FIG. 1, as an actuator of the second friction clutch 26 mentioned above, a linear actuator is applied, which is constructed with a rack 61, a clutch lever 56 for connecting between the rack 61 and the second friction clutch 26, a small gear 59 meshed with the rack 61, and a stepping motor 53. With the above-mentioned stepping motor 53, since it is possible to recognize the rotation angle thereof by means of the number of steps preset in advance, measurement can be made on the distance of shifting of the rack 61, thus, a stroke of the above-mentioned second friction clutch 26, therefore it is possible to estimate or forecast the transmission torque of the second friction clutch 26 with high accuracy. Further, the actuator mechanism mentioned above is also applied to, as an actuator (not shown in the figure) for the first friction clutch 25.

On a while, for the movement of the hub sleeve 6 mentioned above, a linear actuator is applied to, which is constructed with a rack 62, a small gear 60 meshed with the rack 62, and a DC (Direct Current) motor (1) 54. Outer peripheral portion of the hub sleeve 6 is made free in the rotational direction of the second input shaft 24, and a lever 57 is provided, which does not rotate together with the rotation of the hub sleeve 6. The DC motor (1) 54 is designed so that the torque is controlled depending upon current or voltage thereto, and has such the construction that acceleration can be controlled when the hub sleeve 6 moves in the axial direction. Also, the actuator mechanism mentioned above may be applied to the actuator (now shown in the figure) for the hub sleeve 3 mentioned above.

In the similar manner, for the movement of the hub sleeve 14 mentioned above, a linear actuator is applied to, which is constructed with a rack 63, a small gear 61 meshed with the rack 63, and a DC (Direct Current) motor (2) 55. Outer peripheral portion of the hub sleeve 14 is made free in the rotational direction of the second input shaft 24, and a lever 58 is provided, which does not rotate together with the rotation of the hub sleeve 14. The DC motor (2) 55 is designed so that the torque is controlled depending upon current or voltage thereto, and has such the construction that acceleration can be controlled when the hub sleeve 14 moves in the axial direction. Also, the actuator mechanism mentioned above may be applied to the actuator (now shown in the figure) for the hub sleeve 9 mentioned above.

Figure 2:
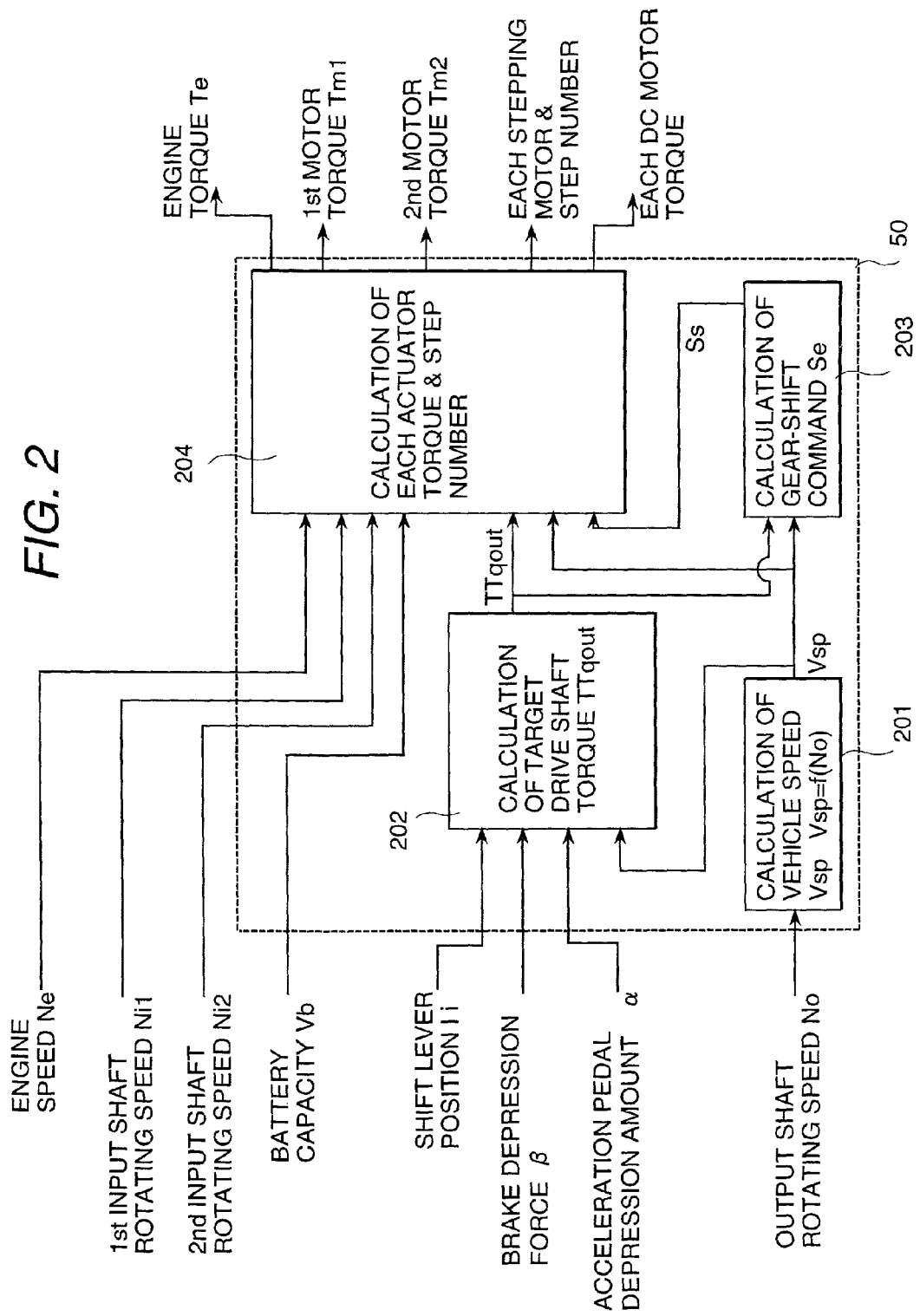
FIG. 2 shows the control blocks of the embodiment shown in FIG. 1.

Next, explanation will be given on a controller of the engine 1, the first motor 29, the second motor 30 and the gear-type transmission 100, by referring to a control block shown in FIG. 2, on the torque characteristics on a target drive shaft (target drive shaft torque characteristics) shown in FIG. 3, and also on the characteristics of gear-shift commands.

First of all, into a power train control unit 50 shown in the FIG. 1 are inputted a depression amount "α" of an acceleration pedal, a depression force "β" of an brake pedal, the position of a shift lever "Ii", the battery capacity "Vb" detected from a battery 49, an engine rotating speed "Ne" detected by the engine rotating speed sensor 44 mentioned above, a rotating speed "Ni1" of the first input shaft detected by the sensor 45 mentioned above, a rotating speed "Ni2" of the second input shaft detected by the sensor 46 mentioned above, and an output shaft rotating speed "No" detected by the sensor 47 mentioned above. And, in the power train control unit 50 mentioned above, the torque of the engine 1 is calculated, and is sent or transmitted to an engine control unit 51 through LAN as a communication means. In the engine control unit 51, an opening angle of the throttle valve, an amount of fuel and the ignition timing are calculated out for accomplishing the torque of the engine 1 transmitted, thereby to control the actuators thereof, respectively. With the motor control unit 52 mentioned above, the battery 49 is charged up with the electric power obtained from the first motor 29 and the second motor 30, and/or the electric power is supplied from the battery 49, so as to drive the first motor 29, the second motor 30, the stepping motor 53, the DC motor (1) 54, and the DC motor (2) 55, etc. In the FIG. 2, within the power train control unit 50, first of all a vehicle speed "Vsp" is calculated out from the output shaft rotating speed "Non by a function "f" in a step 201. Next, in a step 202, a target drive shaft torque "TTqOut", at which a driver aims to, is calculated out from the vehicle speed "Vsp", the acceleration pedal depression amount "α", the brake pedal depression force "β", and the shift lever position "Ii". And, in a step 203, a gear-shift command (or shift command) "Ss" is calculated out from the above-mentioned target drive shaft torque "TTqOut" and the vehicle speed "Vsp", thereby selecting a predetermined step in transmission. Finally in a step 204, from the above-mentioned target drive shaft torque "TTqOut", the vehicle speed "Vsp", the battery capacity "Vb", the engine rotating speed (or engine speed) "Ne", and the first input shaft rotation speed "Ni1" and the second input shaft rotating speed "Ni2", the torque for each actuator (i.e., the engine torque "Te", the first motor torque "Tm1", the second motor torque "Tm2", and each the DC motor toque) and the number of steps of each the stepping motor are calculated out, and are outputted.

Figure 3:
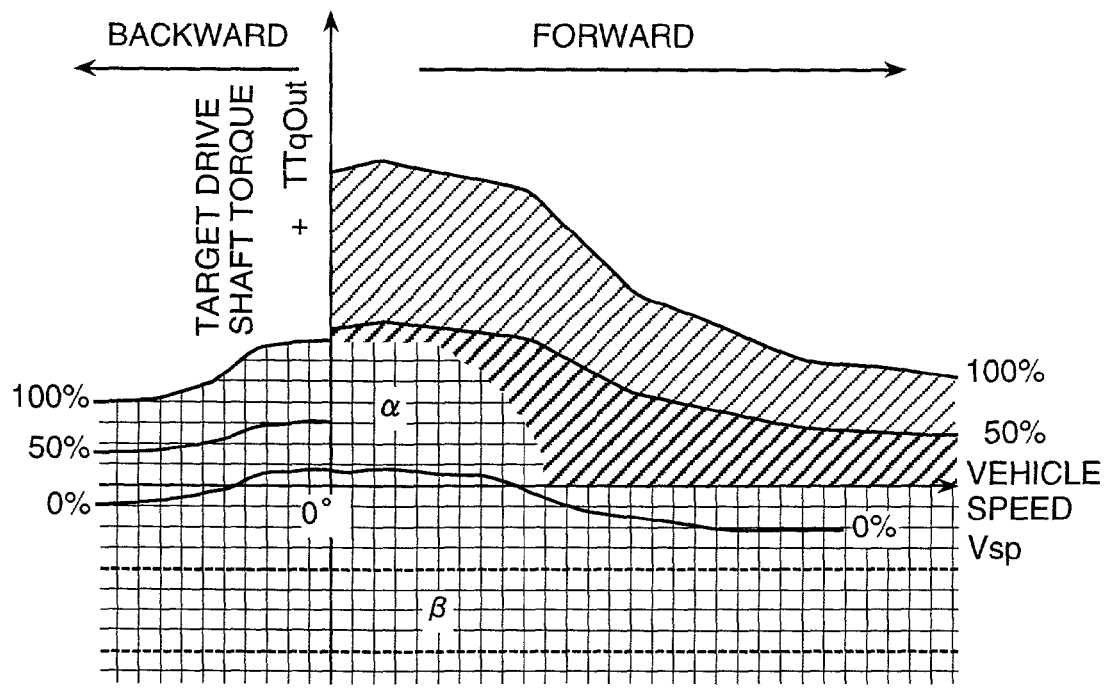
FIG. 3 shows a graph of showing a target drive shaft torque characteristics of the embodiment shown in FIG. 1.

FIG. 3 shows the torque characteristics of a target drive shaft, wherein the horizontal axis indicates the vehicle speed "Vsp" while the vertical axis the target drive shaft torque "TTqOut". It is assumed that an upper side than an intersection point of the two (2) axes mentioned above is in the positive direction of the target drive shaft torque "TTqOut", while a lower side in the negative direction thereof. Also, a right-hand side than the intersection point indicates an advance or forward movement, while the left-hand side a retreat or backward movement. Solid lines depict the acceleration pedal depression amounts "α", and dotted lines the brake pedal depression force "β". The bigger the acceleration pedal depression amount "α" (indicated by %), the larger the acceleration feeling which the driver demands, therefore the target drive shaft torque "TTqOut" comes to be large. Herein, since there is no necessity of increasing up the vehicle speed as in the forward movement, when moving backward, therefore the above-mentioned target drive shaft torque "TTqOut" comes to be small. The brake pedal depression force "β" comes to be larger in the value thereof as it goes down in the graph of FIG. 3, and it indicates that the driver demands a large deceleration. Also, at a low vehicle speed of 0% in the acceleration pedal depression amount "α", the above-mentioned target drive shaft torque "TTqOut" is turned to the positive, so that creep torque is generated in the manner similar to an AT car equipped with a torque converter, and when the remaining capacity of the battery 49 is larger than a predetermined value, the car runs with the driving power of the first motor 29 and the second motor 30 mentioned above. Or, when the remaining capacity of the battery 49 is smaller than the predetermined value, the car runs with the driving power of the engine 1. Next, explanation will be given on a driving areas or regions of applying the engine 1 and the first motor 20, and the second motor 30. A meshed area in the figure indicates an area of motor driving, while an area with slanting lines indicates that of engine driving or driving area of both the engine and the motor in common. Normally, in the area where the target drive shaft torque "TTqOut" is small, for example, in a low speed range when the car moves forward or when moving backward, the car should be driven by only using the motors, i.e., the first motor 29 and the second motor 30, from a viewpoint of the driving performances or drivability, such as, comfortableness of riding in a car and/or responsibility. Or, when the target drive shaft torque "TTqOut" is negative, regenerative drive is executed by means of the first motor 29 and the second motor 30, thereby achieving or establishing both the deceleration which the driver demands and the reduction of the fuel efficiency through energy collection therefrom.

Figure 4:
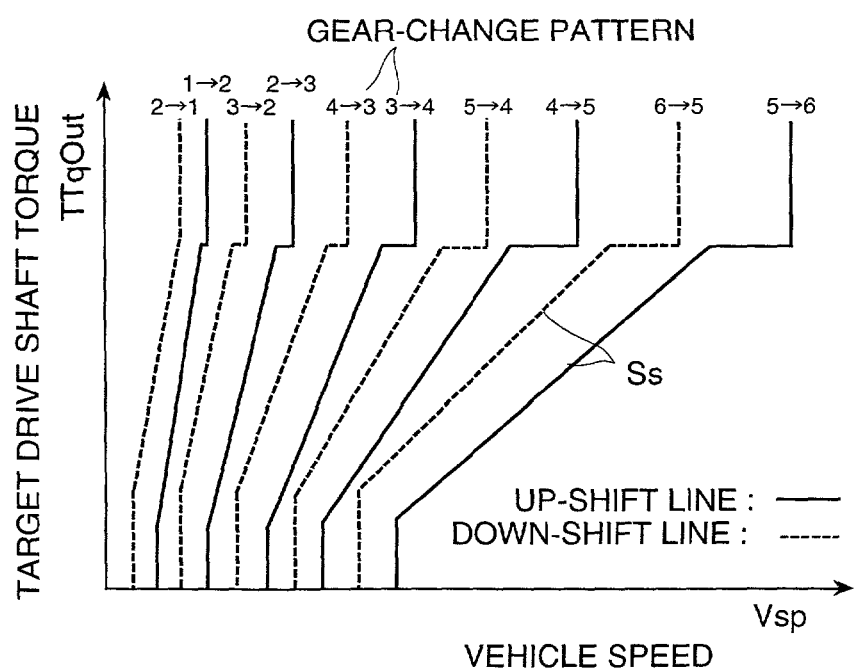
FIG. 4 shows a graph of showing gearshift commands of the embodiment shown in FIG. 1.

FIG. 4 shows, for bringing the drive range of the engine 1, the first motor 29 and the second motor 30 up to further high efficiency, characteristics of the gear-shift command "Ss" to the gear-type transmission 100. In the FIG. 4, wherein solid line indicate up-shift line (for example, from the $1^{st}$ speed to the $2^{nd}$ speed) while broken line down-shift line (for example, from the $2^{nd}$ speed to the $1^{st}$ speed), the gear-shift command "Ss" is determined by the vehicle speed "Vsp" and the target drive shaft torque "TTqOut". The above gear-shift command "Ss" is obtained in advance, at the values where the engine 1, the first motor 29 and the second motor 30 show the high efficiency within all of the driving ranges, through experiments or a simulation thereof, and they are memorized in a memory means (not shown in the figure) in the power train control unit 50 mentioned above.

By referring to FIGS. 5 through 10, explanation will be given on operation principles of the system structure shown in the FIG. 1. In particular, FIG. 5 shows an operation principle of a motor running mode, FIG. 6 an alternator mode, FIG. 7 a charging while stopping mode and a series mode, FIG. 8 a parallel mode, and FIGS. 9 and 10 the operation principle of a series/parallel common mode.

Figure 5:
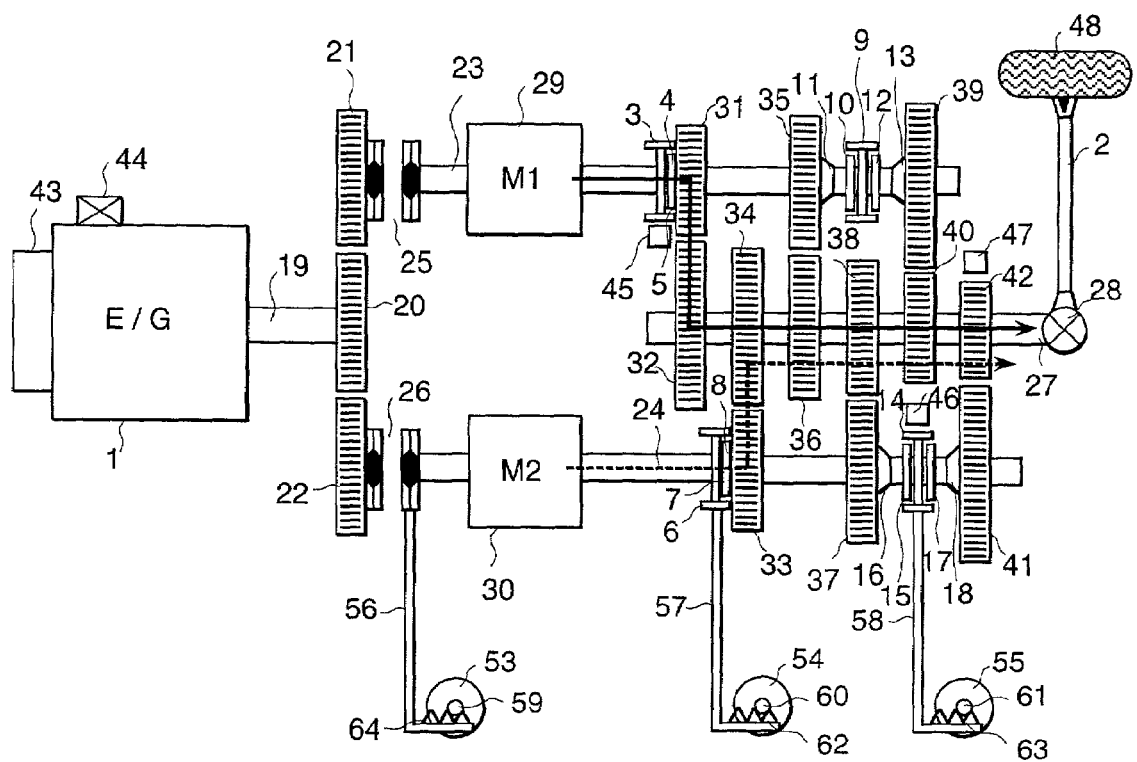
FIG. 5 shows operation principle of the embodiment shown in FIG. 1, in particular, under a motor running mode.

The motor running mode in FIG. 5 is a mode where the car is running by driving at least one of the first motor 29 and the second motor 30 with an output discharging from the battery 49. In this case, the first friction clutch 25 is released while the hub sleeve 3 is connected to the gear 31 directly, so as to set the gear-type transmission 100 at the $1^{st}$ speed in the transmission ratio, thereby traveling with the driving power of the first motor 29. In this instance, the torque transmission route of the first motor 29 is, as indicated by solid lines in the figure: i.e., the first input shaft 23→the hub sleeve 3→the gear 31→the gear 32→the output shaft 27. However, the hub sleeve 9 may be connected to the gear 35 or 39 directly, thereby setting the transmission ratio of the gear-type transmission 100 at the $3^{rd}$ speed or the $5^{th}$ speed, so as to travel. It is also possible to release the second friction clutch 26 while connecting the hub sleeve 6 to the gear 33 directly, so as to set the transmission ratio of the gear-type transmission 100 at the $2^{nd}$ speed, thereby traveling with the driving power of the second motor 30. In this instance, the torque transmission route of the first motor 29 is, as indicated by dotted lines in the figure: i.e., the second input shaft 24→the hub sleeve 6→the gear 33→the gear 34→the output shaft 27. However, the hub sleeve 14 may be connected to the gear 37 or 41 directly, thereby setting the transmission ratio of the gear-type transmission 100 at the $4^{th}$ speed or the $6^{th}$ speed, so as to travel. Further, in a case when the target drive shaft torque "TTqOut" is large, it is possible to drive the first motor and the second motor, simultaneously, so as to travel. In this instance, for escaping from interference in the torque between both, the first motor 29 and the second motor 30, both the first friction clutch 25 and the second friction clutch 26 are in the release condition. Also, in case of traveling with either one of the motors, for example, when traveling with the first motor 29, it is preferable to bring the second friction clutch 26 in the release condition, or both the hub sleeve 6 and the hub sleeve 17 in a neutral condition, so as to cut off the engine 1, thereby reducing electric power consumption of the battery 49.

Figure 6:
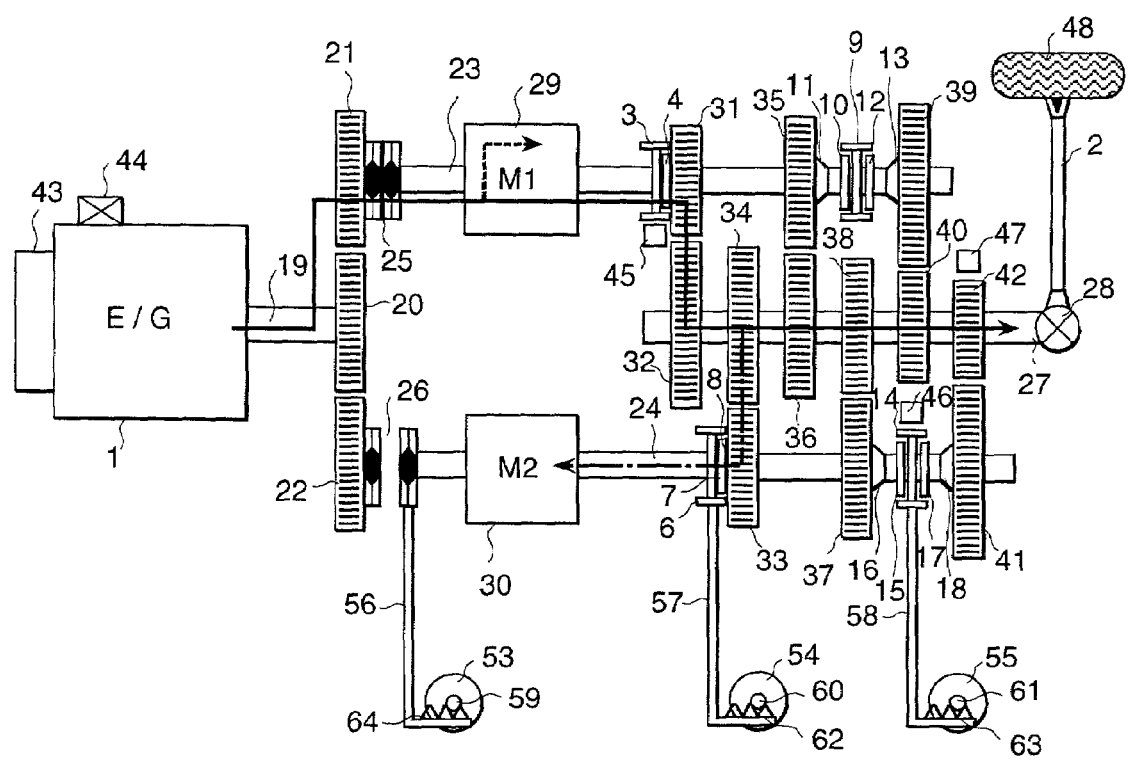
FIG. 6 shows operation principle of the embodiment shown in FIG. 1, under an alternator mode.

The alternator mode in FIG. 6 is a mode where at least one of the first motor 29 and the second motor 30 is driven by a part of the motive power of the engine 1 for power generation during the traveling with the driving force of the engine 1, thereby to charge the battery with the output generated from the motor(s). First, explanation will be made on a case where the torque of the engine 1 is transmitted through the first input shaft 23. In this case, the first friction clutch 25 is closed while the second friction clutch 26 is released, so as to connect the hub sleeve 3 to the gear 3 directly, and the transmission ratio of the gear-type transmission 100 is set to the $1^{st}$ speed, thereby to travel with the driving force of the engine 1. In this instance, the torque transmission route of the engine 1 is, as indicated by a solid line in the figure: i.e., the engine output shaft 19→the gear 20→the gear 21→the first friction clutch 25→the first input shaft 23→the hub sleeve 3→the gear 31→the gear 32→the output shaft 27, therefore as shown by a dotted line in the figure, it is possible to drive the first motor 29 to generate electricity with using a part of the driving force of the engine 1. Further, connecting of the hub sleeve 6 to the gear 33 directly, or connecting the hub sleeve 14 to the gear 37 or 41 directly, as is shown by a one-dotted chain lines in the figure, enables driving of the second motor 30 to generate electricity therefrom. Also, when driving only the first motor so as to generate electricity therefrom, it is preferable to turn both the hub sleeves 6 and 14 into the neutral condition, thereby cutting off the second motor so as to reduce the fuel consumption of the engine 1. Further, the alternator mode mentioned above can be also achieved, in the similar manner, in a case where the hub sleeve 9 is connected to the gear 35 or 39 directly, and where the transmission ratio of the gear-type transmission 100 is set at the $3^{rd}$ speed or the $5^{th}$ speed, thereby traveling with the driving force of the engine 1. Next, explanation will be made on a case (not shown in the figure) where the torque of the engine 1 is transmitted through the second input shaft. In this case, the first friction clutch 25 is released while the second friction clutch 26 is closed, and the hub sleeve 6 is connected to the gear 33 directly, so as to set the transmission ratio of the gear-type transmission 100 at the $2^{nd}$ speed, thereby to travel with the driving force of the engine 1. In this instance, the torque transmission route of the engine 1 is: i.e., the engine output shaft 19→the gear 20→the gear 22→the second friction clutch 26→the second input shaft 24→the hub sleeve 6→the gear 33→the gear 34→the output shaft 27, therefore it is possible to drive the second motor 30 to generate electricity with using a part of the driving force of the engine 1. Further, connecting the hub sleeve 3 to the gear 31 directly, or connecting the hub sleeve 9 to the gear 35 or 39 directly, enables driving of the first motor 29 to generate electricity therefrom. Also, when driving only the second motor, so as to generate electricity therefrom, it is preferable to turn both the hub sleeves 3 and 9 into the neutral condition, thereby cutting off the first motor so as to reduce the fuel consumption of the engine 1. Further, the alternator mode mentioned above can be achieved also, in the similar manner, in a case where the hub sleeve 14 is connected to the gear 37 or 41 directly, and where the transmission ratio of the gear-type transmission 100 is set at the $4^{th}$ speed or the $6^{th}$ speed, thereby traveling with the driving force of the engine 1. In this manner, in the alternator mode mentioned above, since the first motor 29 and the second motor 30 can be driven, simultaneously, as shown by the dotted line in the figure, it is possible to select one to be better in the efficiency of electric power generation, depending upon the drive range of the first motor 29 and the second motor 30 (i.e., the range determined by the motor rotating speed and the motor torque).

Figure 7:
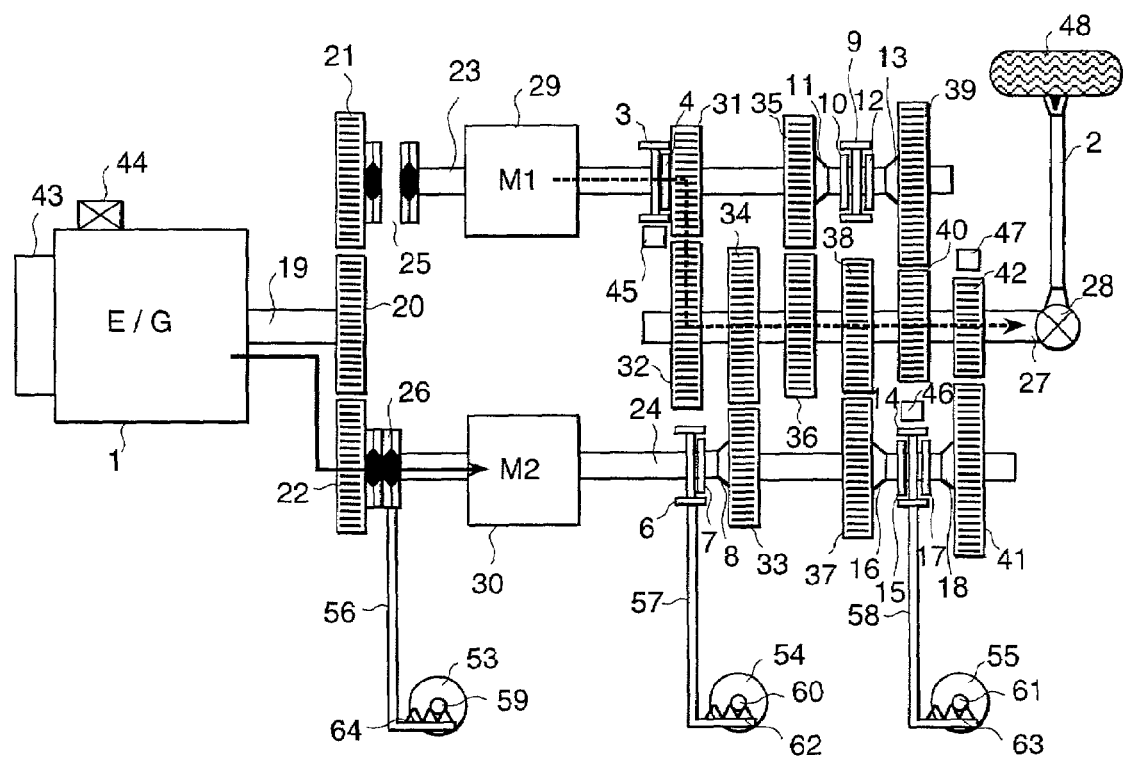
FIG. 7 shows operation principle of the embodiment shown in FIG. 1, in particular, under a charging while sopping mode and a series mode.

The charge while stopping mode in FIG. 7 is a mode where at least one of the first motor 29 and the second motor 30 is driven to generate electricity therefrom by the engine 1, under the condition that a car is stopping. Also, the series mode is a mode where the other motor is driven by an output generated by either one of the first motor 29 or the second motor 30, thereby traveling. First, explanation will be made on the charge while stopping mode mentioned above. In this case, the first friction clutch 25 is released while the second friction clutch closed, and both the hub sleeve 6 and the hub sleeve 14 are in the neutral condition. In this instance, the torque transmission route of the engine 1 is as indicated by a solid line in the figure: i.e., the engine output shaft 19→the gear 20→the gear 22→the second friction clutch 26→the second input shaft 24→the second motor 30, therefore since the torque transmission to the output shaft 27 is cut off, it is possible to drive the second motor 30 to generate electricity therefrom, under the condition that the car is stopped. Next, explanation will be made on the series mode. In this case, the first friction clutch 25 is released while the second friction clutch 26 closed. And, the hub sleeve 3 is connected to the gear 31 directly, while all of the hub sleeves 9, 6 and 14 are in the neutral condition. In this instance, the torque transmission route of the engine 1 is same to that under the charge while stopping mode mentioned above, therefore it is possible to drive the second motor 30 to generate electricity therefrom. It is also possible to drive the first motor 29 with the output generated by the second motor 30, to travel, wherein the torque transmission route of the first motor 29 in this instance is, as indicated by the dotted line in the figure: i.e., the first input shaft 23→the gear 31→the gear 32→the output shaft 27. In this manner, when an intention to start by the driver is detected through the operation upon the acceleration pedal by the driver in the charge while stopping mode, the series mode is achieved, in which the first motor 29 is driven to travel while the second motor 30 is driven to generate electricity by the engine 1, thereby enabling immediate start with smoothness. Also, with closing the first friction clutch 25 while releasing the second friction clutch 26, and connecting the hub sleeve 6 directly to the gear 33 while bringing all of the hub sleeves 3, 9 and 14 in the neutral condition, it is possible to obtain the charge while stopping mode where the first motor 29 is driven to generate electricity under the condition that the car stops, and when detecting the intention of the driver to start, it is possible to obtain the series mode, in which the second motor 30 is driven to travel while the first motor 29 is driven to generate electricity therefrom. Further, under such the charge while stopping mode, with closing both the first friction clutch 25 and the second friction clutch 26 while all of the hub sleeves 3, 9, 6 and 14 in the neutral condition, it may also possible to drive the first motor 29 and the second motor 30, simultaneously, to generate electricity therefrom, under the condition where the car is stopping.

Figure 8:
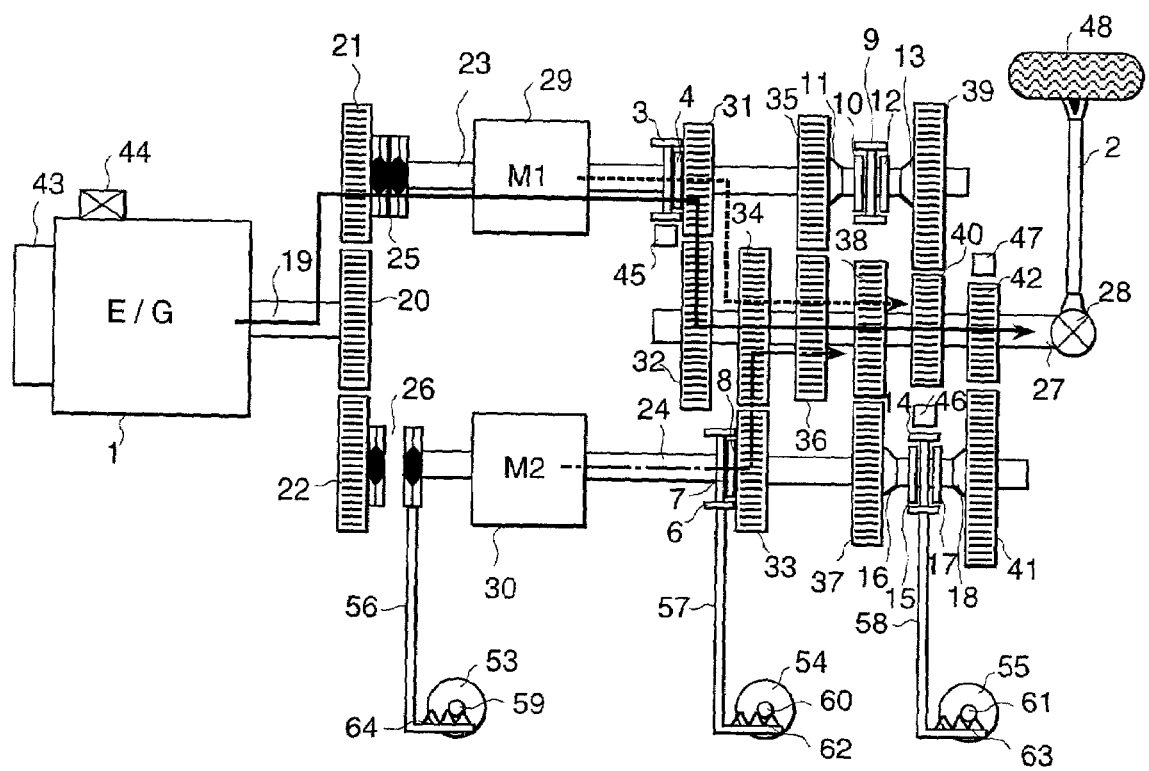
FIG. 8 shows operation principle of the embodiment shown in FIG. 1, in particular, under a parallel mode.

The parallel mode in FIG. 8 is a mode where any one of the first motor 29 or the second motor 30 is driven to assist the acceleration with an output discharging from the battery 49 during traveling with the driving power of the engine 1, thereby improving the driving performance or drivability of the car. First, explanation will be made on a case where the car is traveling with the driving power of the engine 1 while setting the transmission ratio of the gear-type transmission 100 at the 1$^{st}$ speed. The first friction clutch 25 is closed while the second friction clutch 26 released, and the hub sleeve 3 is directly connected to the gear 31 while the hub sleeve 9 in the neutral condition. In this instance, the torque transmission route of the engine 1 is, as indicated by the solid line in the figure: i.e., the engine output shaft 19→the gear 20→the gear 21→the first friction clutch 25→the first input shaft 23→the hub sleeve 3→the gear 31→the gear 32→the output shaft 27. Under this condition, in a case where the target drive shaft torque "TTqOut" comes to be large due to depression of the acceleration pedal by the driver, since there occurs a response delay a little bit on the torque of the engine 1, therefore it is preferable to provide an acceleration assist by means of the driving power of a motor having a relatively small response delay. In a case where the first motor 29 is driven by the output discharging from the battery 49, the torque transmission route of the first motor 29 is, as indicated by the dotted line in the figure: i.e., the first input shaft 23→the hub sleeve 3→the gear 31→the gear 32→the output shaft 27, therefore it is possible to obtain the acceleration assist. Also, by connecting the hub sleeve 6 to the gear 33 directly, or connecting the hub sleeve 14 to the gear 37 or 41 directly, it is possible to drive the second motor 30, so as to achieve the acceleration assist. In a case where the hub sleeve 6 is directly connected to the gear 33, the torque transmission route of the second motor 30 is, as indicated by the one-dotted chain line in the figure: i.e., the second input shaft 24→the hub sleeve 6→the gear 33→the gear 34→the output shaft 27. Further, the parallel mode mentioned above can be achieved also in the case where the car is running with the driving power of the engine 1, wherein the hub sleeve 3 is in the neutral condition while the hub sleeve 9 is directly connected to the gear 35 or 39, so as to set the transmission ratio at the 3$^{rd}$ speed or the 5$^{th}$ speed, thereby traveling with the driving power of the engine 1. And also, when achieving the acceleration assist by means of only the first motor 29, it is preferable to reduce the fuel consumption of the engine and the electric power consumption of the battery by setting both the hub sleeves 6 and 14 in the neutral condition, thereby cutting off the second motor 30. Next, explanation will be made on the case (not shown in the figure) where the transmission ratio of the gear-type transmission 100 is set at the 2$^{nd}$ speed, thereby traveling with the driving power of the engine 1. The first friction clutch 25 is released while the second friction clutch 26 closed, and the hub sleeve 6 is directly connected to the gear 33 while the hub sleeve 14 in the neutral condition. In this instance, the torque transmission route of the engine 1 is: i.e., the engine output shaft 19→the gear 20→the gear 22→the second friction clutch 26→the second input shaft 24→the hub sleeve 6→the gear 33→the gear 34→the output shaft 27. Under this condition, in a case where the target drive shaft torque "TTqOut" comes to be large due to depression of the acceleration pedal by the driver, since there occurs a response delay a little bit on the torque of the engine 1, therefore it is preferable to provide an acceleration assist by means of the driving power of a motor having a relatively small response delay. In a case where the second motor 30 is driven by the output discharged by the battery 49, the torque transmission route of the first motor 29 is: i.e., the second input shaft 24→the hub sleeve 6→the gear 33→the gear 34→the output shaft 27, therefore it is possible to obtain the acceleration assist. Also, with connecting the hub sleeve 3 to the gear 31 directly, or connecting the hub sleeve 9 to the gear 35 or 39 directly, it is possible to drive the first motor 29, so as to achieve the acceleration assist. In a case where the hub sleeve 3 is directly connected to the gear 31, the torque transmission route of the first motor 29 is: i.e., the first input shaft 23→the hub sleeve 3→the gear 31→the gear 32→the output shaft 27. Further, the parallel mode mentioned above can be achieved also in the case where the car is running with the driving power of the engine 1, wherein the hub sleeve 6 is in the neutral condition while the hub sleeve 14 is directly connected with the gear 37 or 41, so as to set the transmission ratio at the 4$^{th}$ speed or the 6$^{th}$ speed. And also, when achieving the acceleration assist by means of only the second motor 30, it is preferable to reduce the fuel consumption of the engine and the electric power consumption of the battery, by bringing both the hub sleeves 3 and 9 in the neutral condition, thereby to cut off the first motor 29.

Figure 9:
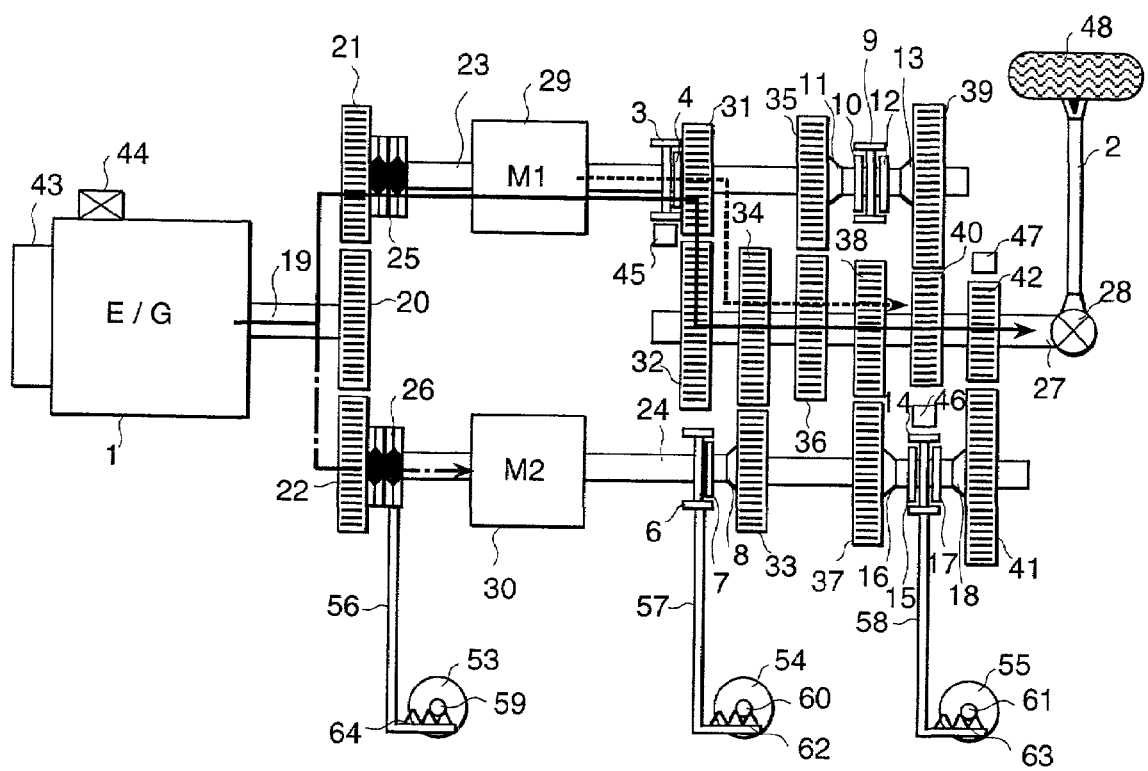
FIG. 9 shows operation principle of the embodiment shown in FIG. 1, in particular, under a series/parallel common mode.

The series/parallel common mode in FIG. 9 is a mode where any one of the first motor 29 and the second motor 30 is driven by a part of the motive power of the engine 1, during traveling with the driving power of the engine 1, thereby achieving the acceleration assist through the driving power of the other motor with an output of power generation obtained therefrom. First, explanation will be made on a case where the car is running with the driving power of the engine 1 while setting the transmission ratio of the gear-type transmission 100 at the 1$^{st}$ speed. Both the first friction clutch 25 and the second friction clutch 26 are closed, and the hub sleeve 3 is directly connected to the gear 31 while the hub sleeve 9 in the neutral condition. In this instance, the torque transmission route of the engine 1 is, as indicated by the solid line in the figure: i.e., the engine output shaft 19→the gear 20→the gear 21→the first friction clutch 25→the first input shaft 23→the hub sleeve 3→the gear 31→the gear 32→the output shaft 27. Further, when driving the second motor 30 to generate electricity therefrom, a part of the motive power of the engine 1 transferred onto the gear 20 is transmitted on the route, as shown by the one-dotted chain line in the figure: i.e., the gear 22→the second friction clutch 26→the second input shaft 24→the second motor 30, therefore it is possible to drive the first motor 29 with using an output of electric power generation from the second motor 30, thereby to achieve the acceleration assist. In this instance, the torque transmission route of the first motor 29 is: i.e., the first input shaft 23→the hub sleeve 3→the gear 31→the gear 32→the output shaft 27. Further, the series/parallel mode mentioned previously can be achieved also in the case where the hub sleeve 3 is in the neutral condition while the hub sleeve 9 is connected to the gear 35 or 39 directly, so as to set the transmission ratio of the gear-type transmission 100 at the 3$^{rd}$ speed or the 5$^{th}$ speed, thereby traveling with the driving power of the engine 1. Next, explanation will be made on the case (not shown in the figure) where the transmission ratio of the gear-type transmission 100 is set at the 2$^{nd}$ speed, thereby traveling with the driving power of the engine 1. Both the first friction clutch 25 and the second friction clutch 26 are closed, and the hub sleeve 6 is directly connected with the gear 33 while the hub sleeve 14 in the neutral condition. Also, both the hub sleeve 3 and the hub sleeve 9 are brought in the neutral condition. In this instance, the torque transmission route of the engine 1 is: i.e., the engine output shaft 19→the gear 20→the gear 22→the second friction clutch 26→the second input shaft 24→the hub sleeve 6→the gear 33→the gear 34→the output shaft 27. Further, when driving the second motor 30 to generate electricity therefrom, a portion of the motive power of the engine 1, which is transferred up to the gear 20, is transmitted on the route: i.e., the gear 21→the first friction clutch 25→the first input shaft 23→the first motor 29, therefore it is possible to drive the second motor 30 with using the output of electric power generation from the first motor 29, thereby to achieve the acceleration assist. In this instance, the torque transmission route of the second motor 30 is: i.e., the second input shaft 24→the hub sleeve 6→the gear 33→the gear 34→the output shaft 27. Further, the series/parallel mode mentioned above can be achieved also in the case where the hub sleeve 6 is brought in the neutral condition while the hub sleeve 14 is connected to the gear 35 or 39 directly, so as to set the transmission ratio of the gear-type transmission 100 at the $4^{th}$ speed or the $6^{th}$ speed, thereby traveling with the driving power of the engine 1.

Figure 10:
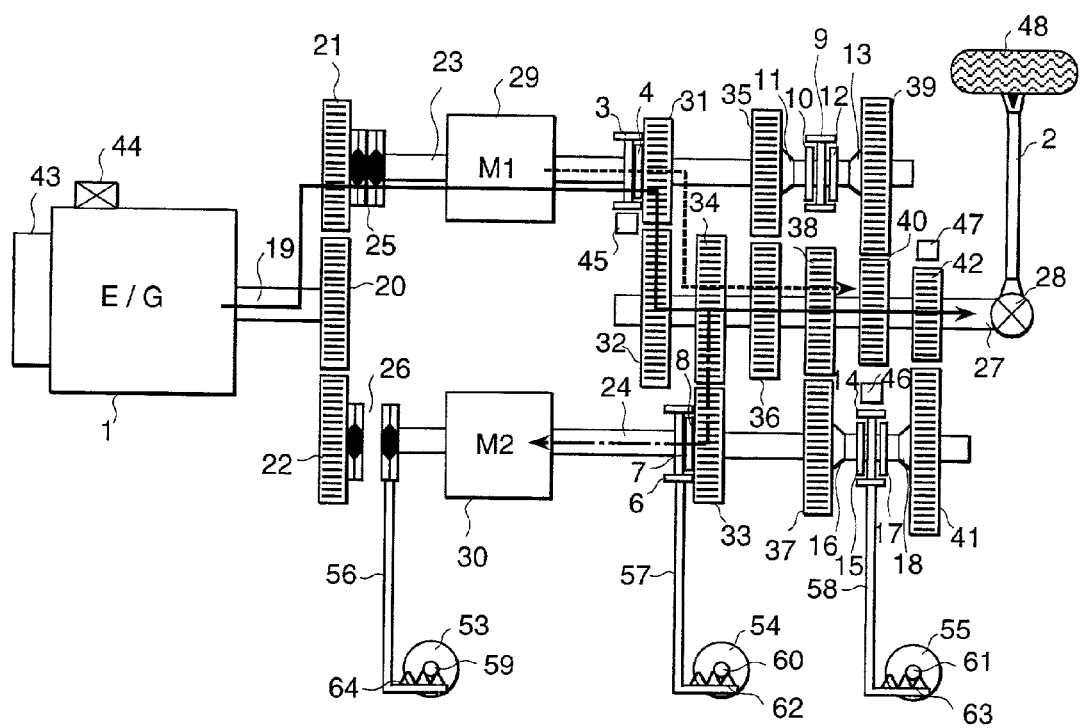
FIG. 10 shows another operation principle of the embodiment shown in FIG. 1, in particular, under the series/parallel common mode.

FIG. 10 shows a method for accomplishing the series/parallel common mode mentioned above, but upon the operation principle, which is different from that shown in the FIG. 9. First, explanation will be made on a case where the car is running with the driving power of the engine 1, wherein the transmission ratio of the gear-type transmission 100 is set at the $1^{st}$ speed. The first friction clutch 25 is closed while the second friction clutch 26 released, and the hub sleeve 3 is directly connected to the gear 31 while the hub sleeve 9 in the neutral condition. In this instance, the torque transmission route of the engine 1 is, as shown by the solid line in the figure: i.e., the engine output shaft 19→the gear 20→the gear 21→the first friction clutch 25→the first input shaft 23→the hub sleeve 3→the gear 31 the gear 32 the output shaft 27. Further, when driving the second motor 30 to generate electricity therefrom, a portion of the motive power of the engine 1 transferred onto the output shaft 27 is transmitted on the route, as shown by the one-dotted chain line in the figure: i.e., the gear 34→the gear 33→the second input shaft 24→the second motor 30, therefore it is possible to drive the first motor 29, so as to achieve the acceleration assist, with using the output of electric power generation from the second motor 30. In this instance, the torque transmission route of the first motor 29 is: i.e., the first input shaft 23→the hub sleeve 3→the gear 31→the gear 32→the output shaft 27. Further, the series/parallel mode mentioned above can be achieved also in the case where the hub sleeve 3 is in the neutral condition while the hub sleeve 9 is directly connected to the gear 35 or 39, so as to set the transmission ratio of the gear-type transmission 100 at the $3^{rd}$ speed or the $5^{th}$ speed, and it maybe also possible to drive the second motor 30, so as to generate electricity therefrom, by bringing the hub sleeve 6 in the neutral condition while connecting the hub sleeve 14 to the gear 37 or 41 directly. Next, explanation will be made on a case (not shown in the figure) where the transmission ratio of the gear-type transmission 100 is set at the $2^{nd}$ speed, thereby running or traveling the car with the driving power of the engine 1. The first friction clutch 25 is released while the second friction clutch 26 closed, and the hub sleeve 3 is directly connected to the gear 31 while the hub sleeve 9 in the neutral condition. Also, the hub sleeve 6 is directly connected to the gear 33, while the hub sleeve 14 in the neutral condition. In this instance, the torque transmission route of the engine 1 is: i.e., the engine output shaft 19→the gear 20→the gear 22→the second friction clutch 26→the second input shaft 24→the hub sleeve 6→the gear 33→the gear 34→the output shaft 27. Further, when driving the second motor 30 to generate electricity therefrom, a portion of the motive power of the engine 1 transferred onto the output shaft 27 is transmitted on the route: i.e., the gear 32→the gear 31→the first input shaft 23→the first motor 29, therefore it is possible to drive the second motor 30 with using an output of electric power generation from the first motor 29, thereby to achieve the acceleration assist. In this instance, the torque transmission route of the second motor 30 is: i.e., the second input shaft 24→the hub sleeve 6→the gear 33→the gear 34→the output shaft 27. Further, the series/parallel mode mentioned above can be achieved also in the case where the hub sleeve 6 is brought in the neutral condition while the hub sleeve 14 is directly connected to the gear 37 or 41, so as to set the transmission ratio of the gear-type transmission 100 at the $4^{th}$ speed or the $6^{th}$ speed, and it may be also possible to drive the first motor 29, so as to generate electricity therefrom, by bringing the hub sleeve 6 in the neutral condition while connecting the hub sleeve 14 to the gear 37 or 41 directly.

Figure 11:
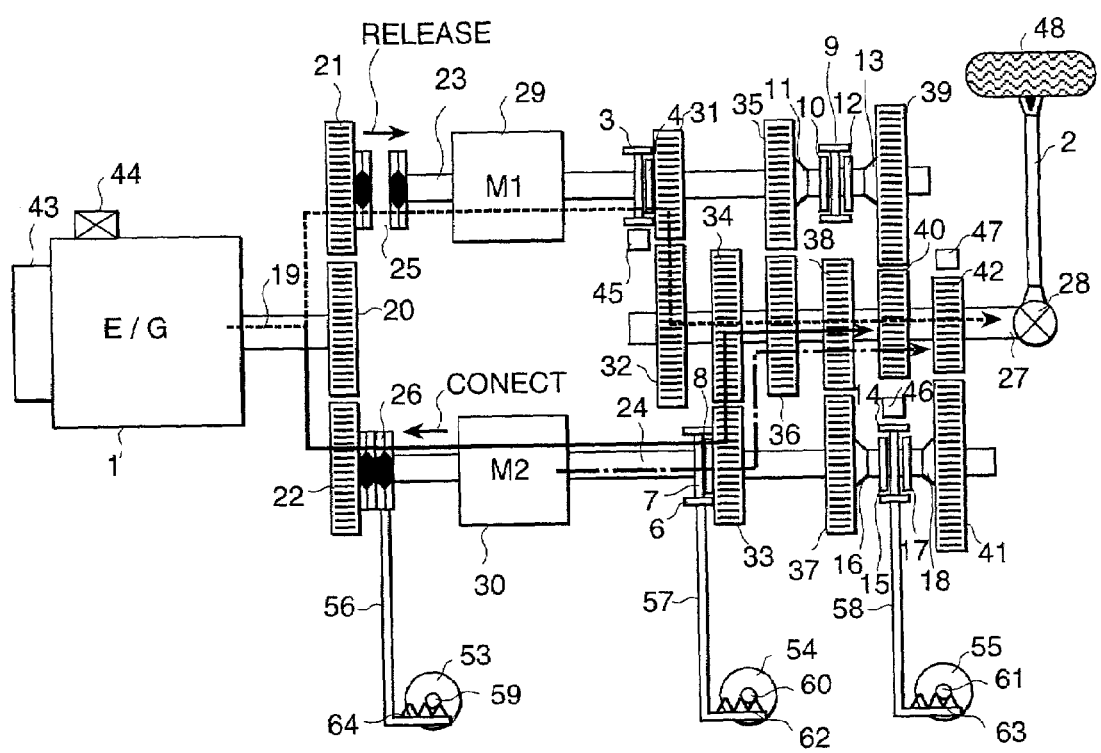
FIG. 11 shows operation principle of the embodiment shown in FIG. 1, in particular, during the gearshift from clutch to clutch (clutch-to-clutch gearshift)

Next, the operation principle will be explained about the system shown in the FIG. 1, when shifting the gears, by referring to FIG. 11. As an example, explanation will be made on a case where the transmission is shifted from the $1^{st}$ speed to the $2^{nd}$ speed during the traveling with the driving power of the engine 1. As was mentioned previously, when setting the transmission ratio of the gear-type transmission 100 at the $1^{st}$ speed, the first friction clutch 25 is closed while the second friction clutch 26 released, and the hub sleeve 3 is directly connected to the gear 31 while the hub sleeve 9 in the neutral condition. Also, for performing gear-shifting from the $1^{st}$ speed to the $2^{nd}$ speed, immediately, the hub sleeve 6 is directly connected to the bear 33 while keeping the hub sleeve 14 in the neutral condition. The torque transmission route of the engine 1 under the condition of the $1^{st}$ speed is, as shown by an arrow of dotted line in the figure: i.e., the engine output shaft 19→the gear 20→the gear 21→the first friction clutch 25→the first input shaft 23→the hub sleeve 3→the gear 31→the gear 32→the output shaft 27. The gear-shift from the $1^{st}$ speed to the $2^{nd}$ speed is completed by closing the second friction clutch 26, gradually, while releasing the first friction clutch 25 gradually, so as to exchange the torque transmission route of the engine 1. The torque transmission route of the engine under the condition of the $2^{nd}$ speed is, as is shown by an arrow of solid line: i.e., the engine output shaft 19→the gear 20→the gear 22→the second friction clutch 26→the second input shaft 24→the hub sleeve 6→the gear 33→the gear 34→the output shaft 27. The transmission or gear-shift method for exchanging the first friction clutch 25 to the second friction clutch 26, in this manner, is generally called by "clutch-to-clutch gearshift or transmission", and has a merit that the drive shaft torque will not be cut off during the transmission, therefore it is widely applied to, as a transmission method for AT (Automatic Transmission) equipped with a torque converter of the conventional art. However, in the clutch-to-clutch transmission mentioned above, changes occur in torque, such as, drawn (pull-in) and/or thrust (push-up) of the torque on the drive shaft, when changing from the first friction clutch 25 to the second friction clutch 26, therefore there is a problem that the transmission performance is deteriorated so that passenger(s) including the driver on the car feel(s) torque shock. According to the present invention, with using the first motor 29 connected to the first input shaft 23 and the second motor 30 connected to the second input shaft 24, the torque changes are suppressed when the clutches are exchanged. As an example, explanation will be made on the route of the torque transmission of the motor 30 mentioned above, when the clutches are exchanged. The torque transmission route of the motor 30 is, as is shown by the one-dotted chain line in the figure: i.e., the second input shaft 24→the hub sleeve 6→the gear 33→the gear 34→the output shaft 27, therefore it is possible to compensate the drive shaft torque (equal to the torque on the output shaft 27).

Figure 12:
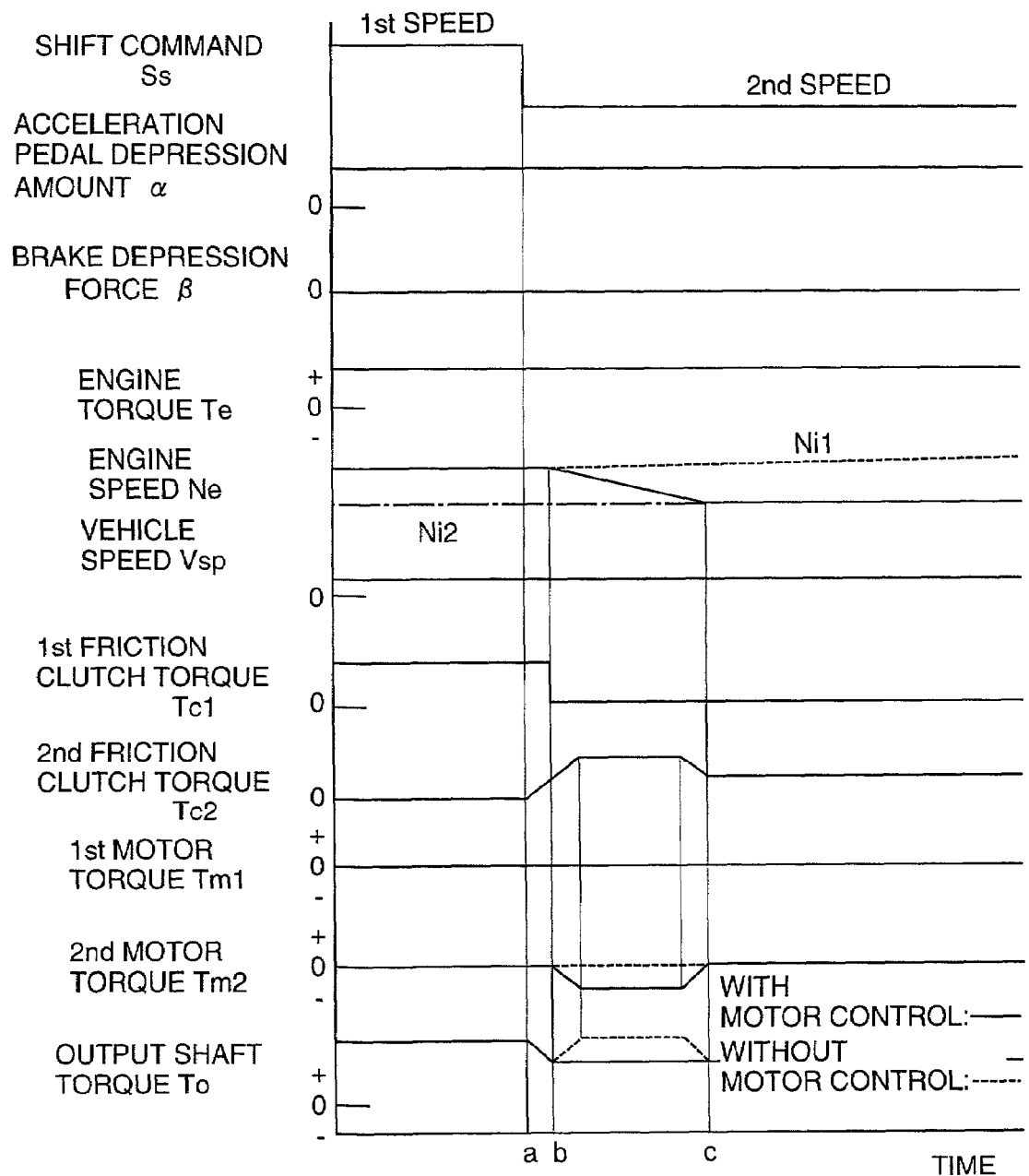
FIG. 12 is a time chart for showing a control method of the embodiment shown in FIG. 1, in particular, during the clutch-to-clutch gearshift.

FIG. 12 is a time chart for showing a control method when conducting the gear-shift from the 1$^{st}$ speed to the 2$^{nd}$ speed. This FIG. 12 shows the "time" on the horizontal axis, while on the veridical axis thereof, the gear-shift command "Ss", the depression amount "α" of acceleration pedal, the depression force "β" of brake pedal, the engine torque "Te", the engine rotating speed "Ne", the vehicle speed "Vsp", the first friction clutch "Tc1", the second friction clutch "Tc2", the first motor torque "Tm1", the second motor torque "Tm2",and the output shaft torque "To", respectively. Also, the rotating speed "Ni1" of the first input shaft is indicated by the broken line while the rotating speed "Ni2" of the second input shaft by the one-dotted chain line, in addition to the chart of the engine rotating speed "Ne", while the second motor torque "Tm2" and the output torque "To" are indicated by the solid lines when the control is conducted by the motor, or by the broken lines otherwise, thus control by the motor is not conducted (without the control). Running condition is in a case where the gear-shift command "Ss" is changed during when the car is running at a constant acceleration pedal depression amount "α". After the change (at a point "a") of the gear-shift command "Ss", when pressing force on the second friction clutch 26 is increased, also the second clutch torque Tc2 increases up gradually, therefore the torque of the engine 1 is transmitted to the second input shaft 24, gradually. Between the point "a" and the point "b" in the figure, if assuming that the first friction clutch is in the closed condition, the torque transmitted through the first friction clutch 25 to the first input shaft 23 comes to "Te−Tc2", therefore the output shaft torque "To_a" between points "a" and "b" can be expressed by the following equation (1):

$$To\_a = G1 \times (Te - Tc2) + G2 \times Tc2 \qquad (1)$$

where, "G1" indicates the transmission ratio at the 1$^{st}$ speed, and "G2" the transmission ratio at the 2$^{nd}$ speed. At the point "b", the second friction clutch torque Tc2 reaches up to a predetermined value, and then the first friction clutch 25 is released, therefore the first friction clutch torque "Tc1" comes to zero (0). For simplification of explanation, the first friction clutch torque "Tc1" is lowered down in a step-like manner herein, when the first friction clutch 25 is released, however the first friction clutch torque "Tc1" maybe lowered gradually, from the point "a". When the first friction clutch 25 is released, the torque of the engine 1 is transmitted by means of only the second friction clutch 26, and then the engine rotating speed "Ne" decreases from the rotating speed "Ni1" of the first input shaft down to the rotating speed "Ni2" of the second input shaft, gradually. In this instance, since the engine rotating speed "Ne" changes, and the second friction clutch torque "Tc2" between the points "b" and "c" is, as indicated by the following equation (2).

$$Tc2 = Te - Ie \times (dNe/dt) \qquad (2)$$

From the equation (2), the output shaft torque "To_b" can be expressed by the following equation (3):

$$To\_b = G2 \times Tc2 = G2 \times \{Te - Ie \times (dNe/dt)\} \qquad (3)$$

where, "Ie" indicates inertia on the engine side. During the gear-sift, as shown by the dotted line in the figure, the second clause of the equation (3), thus, the inertia torque on the engine side appears in the form of the torque changes on the output shaft. Then, during the gear-shift, the second motor 30 is controlled, so as to suppress down the torque changes mentioned above. The second motor torque "Tm2" during the gear-shift is determined according to the following equation (4).

$$Tm2 = Ie \times (dNe/dt) \qquad (4)$$

When executing the control by means of the second motor 30, the output shaft torque "To" during the gear-shift can be expressed by the following equation (5), as is shown by the solid line in the figure.

$$To = G2 \times Tc2 + G2 \times Tm2 = G2 \times Te \qquad (5)$$

At a point "c" of the figure, the engine rotating speed "Ne" is in synchronism with the second input shaft rotating speed "Ni2", and the second clutch 26 is closed completely, thereby completing the gear-shift. The output shaft torque "To_c" after completion of the gear-shift can be expressed by the following equation (6).

$$To\_c = G2 \times Te \qquad (6)$$

As is apparent from the equations (5) and (6), the control of the second motor during the gear-shift enables the suppression of the thrust (or push-up) on the output shaft torque due to the inertia torque during the gear-shift, thereby achieving a smooth gear-shift or transmission performance. Further, the transmission method mentioned above can be also achieved by use of the first motor 29 mentioned above, in the similar manner, and it is applicable to all of the gear shifting patterns of carrying out the clutch-to-clutch gear-shift.

Figure 13:
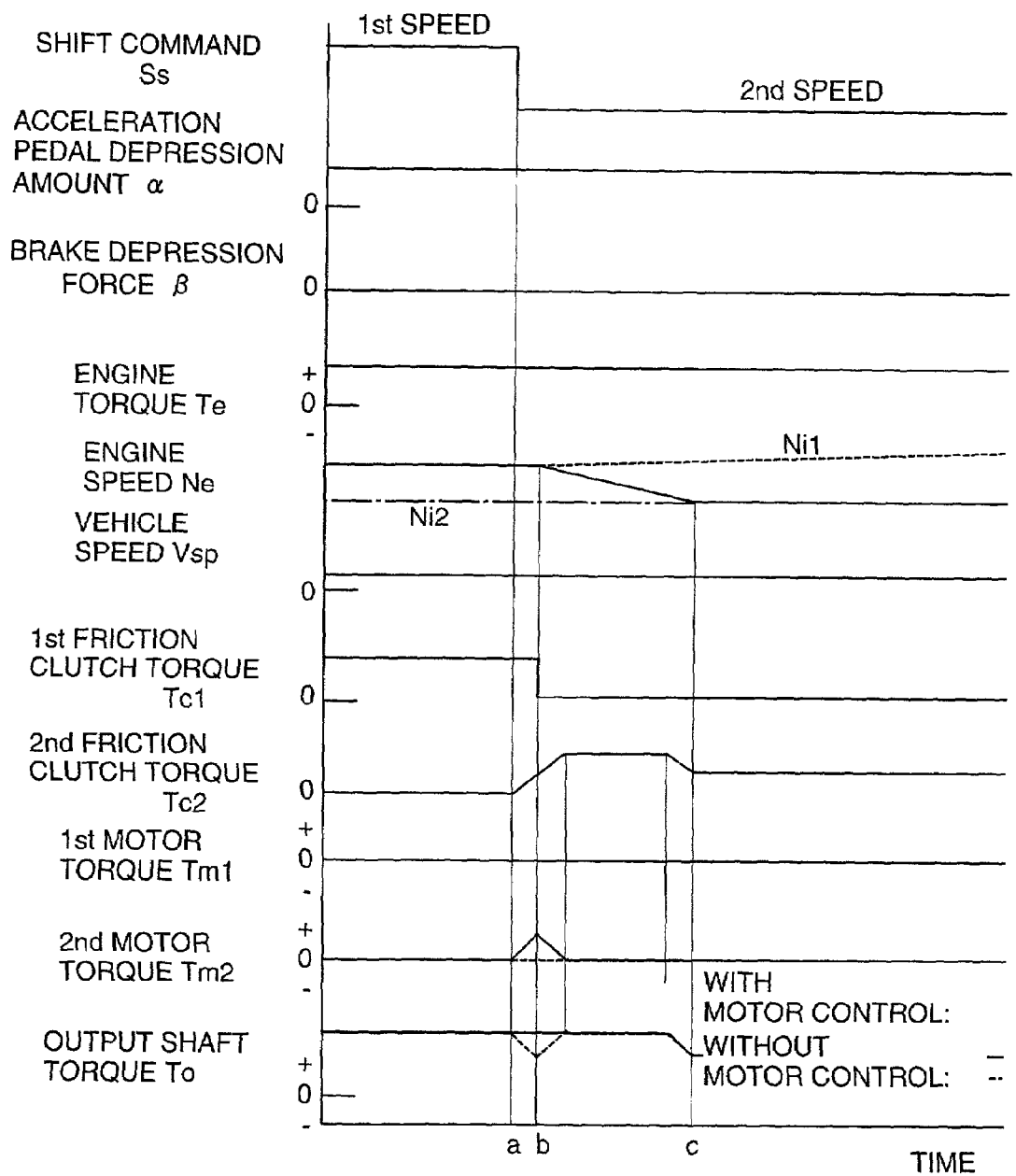
FIG. 13 shows another time chart for showing the control method of the embodiment shown in FIG. 1, in particular, during the clutch-to-clutch gearshift.

FIG. 13 is a time chart for showing another control method, in particular, in a case of shifting from the 1$^{st}$ speed to the 2$^{nd}$ speed. The vertical and the horizontal axes are same to those of the time chart shown in the FIG. 12, and the running condition is also same to that shown in the FIG. 12. After changing the gear-shift command "Ss" is changed (at the point "a"), when increasing the force pressing upon the second friction clutch 26, the output shaft torque "To_a" between the points "a" and "b" can be expressed by the equation (1), in the same manner as is explained in the FIG. 12. And, the output shaft torque at the point "a" is "G1×Te", therefore an amount of drawn (or pull-in), i.e., "ΔTo_a" of the output shaft torque between the points "a" and "b" can be expressed by the following equation (7).

$$\Delta To\_a = G1 \times Te - To\_a = (G1 - G2) \times Tc2 \qquad (7)$$

For the purpose of reducing the "To_a" mentioned above, it is necessary to control the second motor 30, so as to compensate or adjust the torque on the output shaft 27. From the above equation (7), the second motor torque "Tm2" for reducing the "To_a" can be expressed by the following equation (8) because it is transmitted through the 2$^{nd}$ speed gear train (i.e., the gears 33 and 34).

$$Tm2 = \Delta To\_a / G2 = (G1 - G2) \times Tc2 / G2 \qquad (8)$$

The output shaft torque "To" during the gear-shift, when executing the control by means of the second motor 30, can be expressed by the following equation (9), as shown by the solid line in the figure.

$$To = G2 \times Tc2 + G2 \times Tm2 = G1 \times Te \qquad (9)$$

As is apparent from the equation (9), controlling of the second motor 30 enables reduction of the drawn (or pull-in) on the output shaft torque between the points "a" and "b". Between the points "b" and "c", the output shaft torque "To_b" can be expressed by the above equation (3), in the same manner as explained in the FIG. 12. Also, the output shaft torque at the point "b" is "G1×Te", therefore an amount of drawn (or pull-in) of the output shaft torque, i.e., "ΔTo_b" can be expressed by the following equation (10).

$$\Delta To\_b = G1 \times Te - To\_b = (G1 - G2) \times Te + G2 \times Ie \times (dNe/dt) \qquad (10)$$

For the purpose of reducing the "ΔTo_b" mentioned above, between the points "b" and "c", it is necessary to compensate the torque on the output shaft 27 by controlling the second motor 30. From the above equation (10), the second motor torque Tm2 for reducing the "ΔTo_b" mentioned above can be expressed by the following equation (11) because it is transmitted through the $2^{nd}$ speed gear train (i.e., the gears 33 and 34).

$$Tm2=\Delta To\_a/G2=(G1-G2)\times Tc2/G2+Ie\times(dNe/dt) \quad (11)$$

The output shaft torque "To" during the gear-shift, when executing the control by means of the second motor 30, can be expressed by the following equation (12), as shown by the solid line in the figure.

$$To=G2\times Tc2+G2\times Tm2=G1\times Te \quad (12)$$

As is apparent from the equation (12), controlling of the second motor 30 enables reduction of the drawn (or pull-in) on the output shaft torque between the points "b" and "c". In this manner, controlling of the second motor in an initial period of the gear-shift, as well as, during the gear-shift, enables the suppression of the drawn (or pull-in) of the output shaft torque due to the clutch-to-clutch gearshift or transmission, thereby achieving the smooth transmission performance. Further, the transmission method mentioned above can be also realized by using the first motor 29 mentioned above, and it is applicable to all the transmission patterns of performing that clutch-to-clutch transmission.

Figure 14:
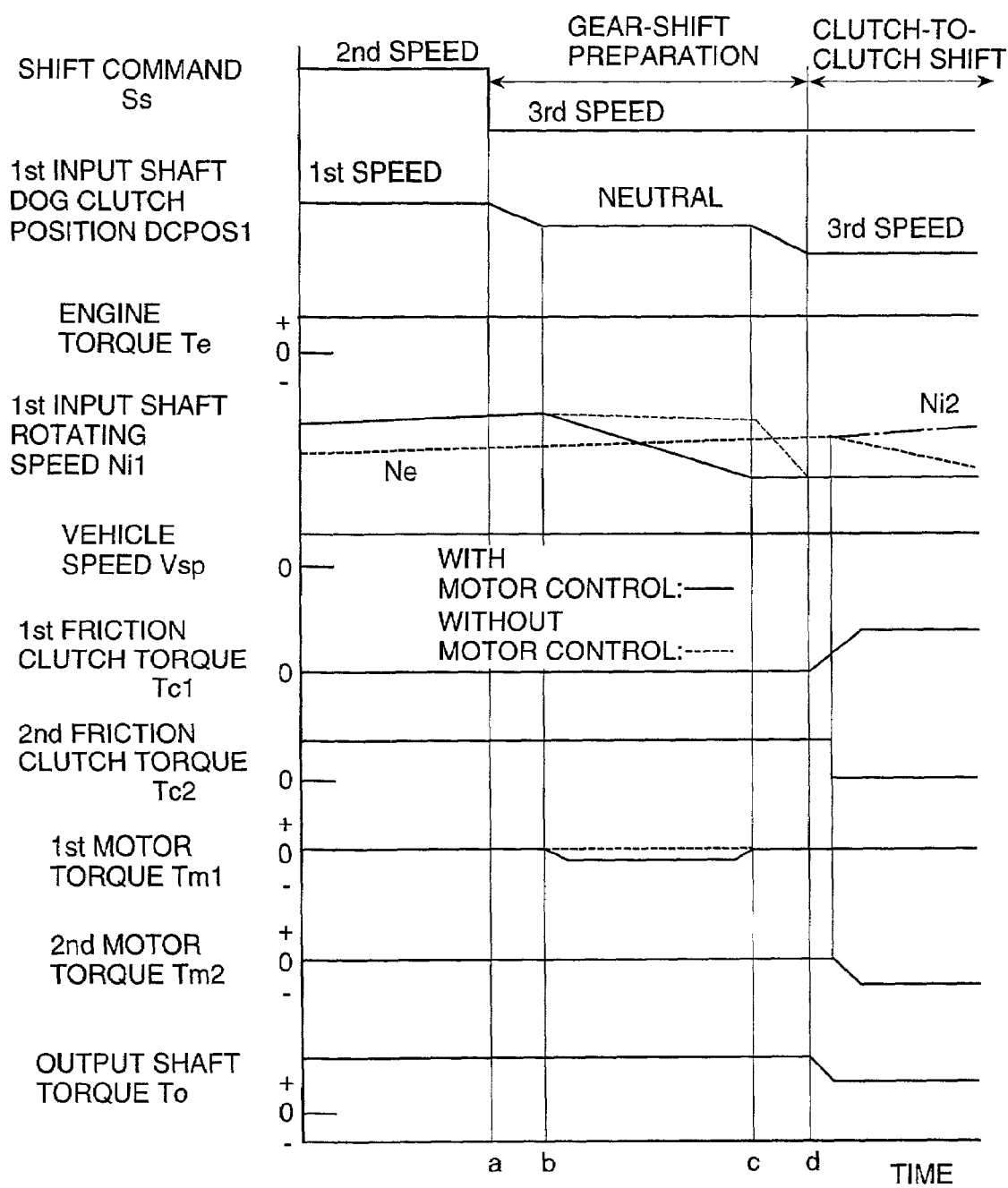
FIG. 14 shows a time chart for showing the control method of the embodiment shown in FIG. 1, in particular, during preparation for gearshift.

FIG. 14 is a time chart for showing a method for performing preparation for transmission, in particular, in a case of the gearshift from the $2^{nd}$ speed to the $3^{rd}$ speed. This FIG. 14 shows the "time" on the horizontal axis, while on the veridical axis thereof, the gear-shift command "Ss", the first input shaft dog clutch position "DPOS1", the first input shaft rotating speed "Ni1", the vehicle speed "Vsp", the first friction clutch torque "Tc1", the second friction clutch torque "Tc2", the first motor torque "Tm1", the second motor torque "Tm2", and the output shaft torque "To", respectively. Also, the engine rotating speed "Ne" is indicated by the broken line while the second input shaft rotating speed "Ni2" by the one-dotted chain line, in addition to the chart of the first input shaft rotating speed "Ni1", and regarding the first motor torque "Tm1" and the first input shaft rotating speed "Ni1", they are depicted by the solid lines when conducting the control by means of the motor(s) while by the dotted lines when not (i.e., without the control). The acceleration pedal depression amount "α" and the brake pedal depression force "β" are same to those shown in those FIGS. 12 and 13. When the shift command "Ss" is changed (at the point "a"), the hub sleeve 3 must be connected to the gear 31, and when the hub sleeve 9 is in the neutral position, the hub sleeve 3 must be released from the gear 31 to be in the neutral position (at the point "b") while the hub sleeve 9 is directly connected to the gear 35 (at the point "c"), so as to set the dog clutch position "DCPOS1" of the first input shaft 23 at the $3^{rd}$ speed, thereby preparing for the clutch-to-clutch transmission. However, when the hub sleeve 9 is directly connected to the gear 35, since the first input shaft rotating speed "Ni1" changes, abruptly, due to the synchronizer 10 (between the points "c" and "d"), there occurs a problem that the above-mentioned synchronizer 10 is worn down remarkably. Therefore, according to the present invention, the rotating speed "Ni1" of the first input shaft 23 is controlled by means of the first motor 29 mentioned above, thereby preventing the synchronizer 10 from the wear-out thereof, when the hub sleeve 9 is connected to the gear 35 directly. When the hub sleeve 3 is released from the gear 31 at the point "b" in the figure, the first motor 29 is controlled so that the rotating speed of the first input shaft 23 goes down. In this instance, the first motor torque "Tm1" is determined by the following equation (13):

$$Tm1=(Ii1+Im1)\times(\Delta Ni1/\Delta t) \quad (13)$$

where, "Ii1" indicates the inertia of the first input shaft 23, "Im1" the inertia of the first motor 29, "ΔNi1" the change of the first input shaft revolution number "Ni", and "Δt" the time for controlling the first input shaft revolution number "Ni", respectively. At the point "c" in the figure, when the first input shaft rotating speed "Ni" reaches to a predetermined value, the hub sleeve 9 is directly connected to the gear 35 (at the point "d"), and then the preparation for transmission when shifting gears from the $2^{nd}$ speed to the $3^{rd}$ speed is completed. Also, it is preferable to determine the target value for the rotating speed control of the first input shaft 23, as shown by the following equation (14):

$$Ni1\_ref=No\times G3 \quad (14)$$

where, "No" indicates the rotating speed of the output shaft 27, and "G3" the transmission ratio at the $3^{rd}$ speed. By determining it to be as indicated by the equation (14), it is possible to suppress the change of the first input shaft rotating speed "Ni1", when the hub sleeve 9 is connected to the gear 35 directly, thereby reducing the wear-out of the synchronizer 10. Furthermore, the preparation for transmission mentioned above can be also achieved in the similar manner, by using the second motor when closing the hub sleeves 6 and 14 provided on the second input shaft 24, and it is also applicable to all of the transmission patterns, which necessitates such the preparation for transmission.

Figure 15:
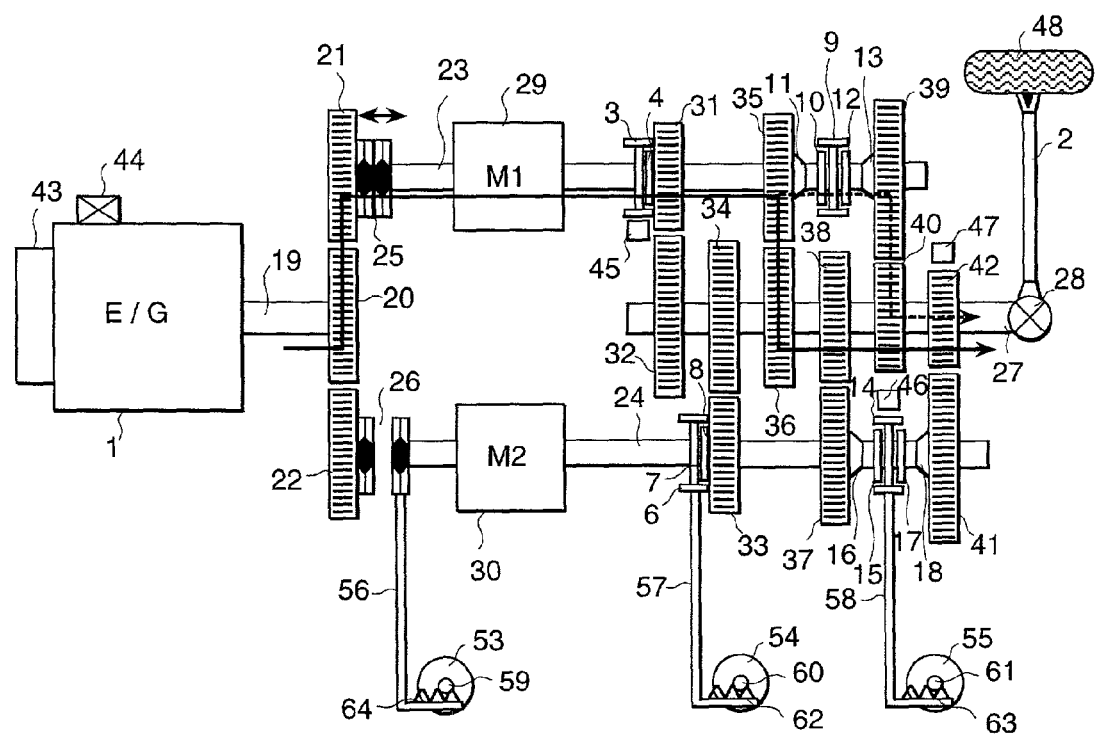
FIG. 15 shows operation principle in exchange of a dog clutch shown in FIG. 1.
Figure 16:
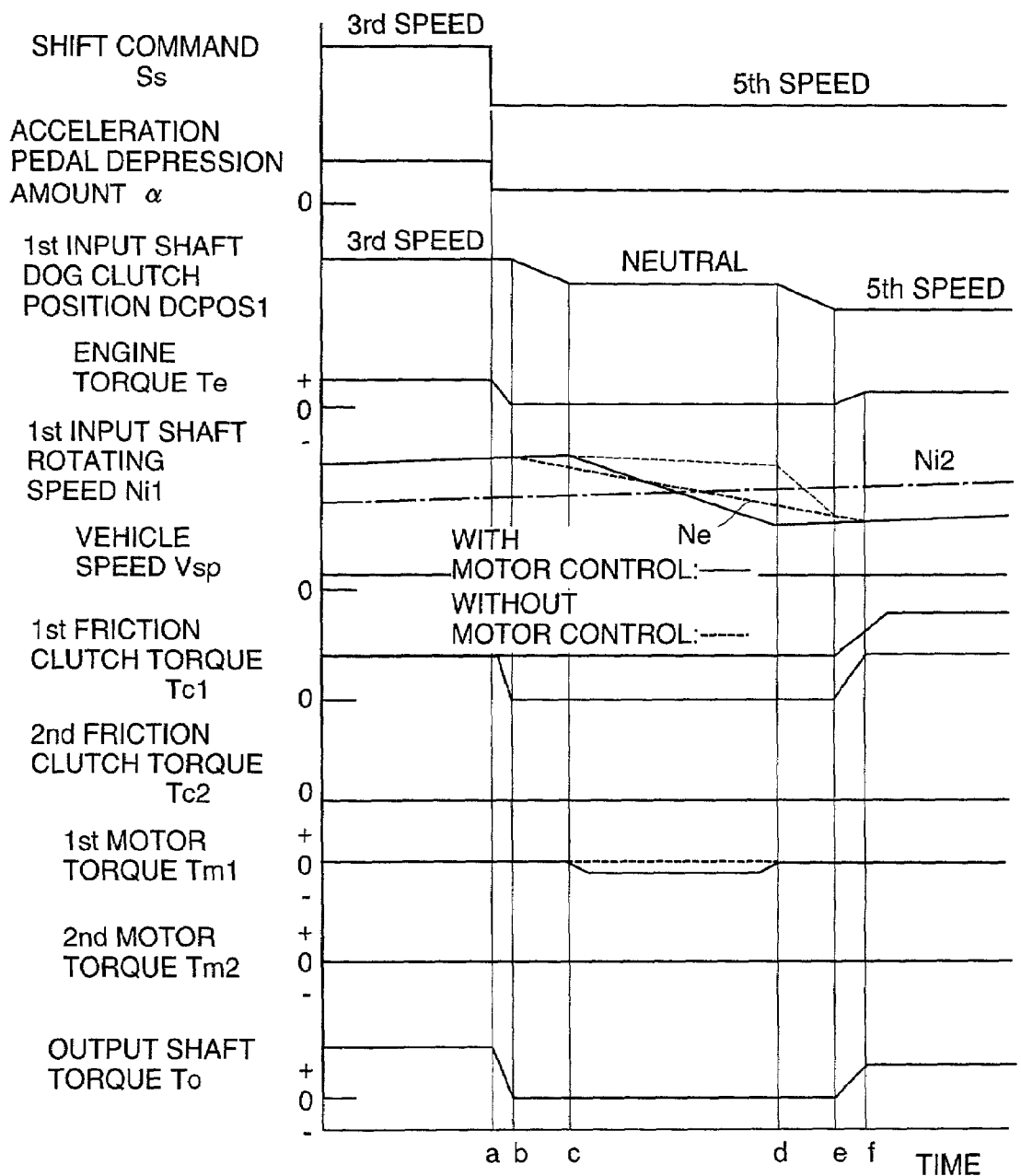
FIG. 16 shows a time chart of a rotating speed control, in particular, when changing over the dog clutch shown in FIG. 1.

Next, in the system shown in the FIG. 1, the operation principle when shifting the gears is explained, in particular, in the case where no such the clutch-to-clutch transmission is conducted, by referring to FIG. 15. As an example, explanation will be made on the case of making the gearshift from the $3^{rd}$ speed to the $5^{th}$ speed during the traveling with the driving power of the engine 1. As was mentioned previously, when setting the transmission ratio of the gear-type transmission 100 to the $3^{rd}$ speed, the first friction clutch 25 is closed while the second friction clutch 26 released, and the hub sleeve 9 is directly connected to the gear 35, thereby to bring the hub sleeve 3 in the neutral condition. The torque transmission route of the engine 1 under the $3^{rd}$ speed condition is, as shown by an arrow of solid line: i.e., the engine output shaft 19→the gear 20→the gear 21→the first friction clutch 25→the first input shaft 23→the hub sleeve 9→the gear 35→the gear 36→the output shaft 27. The gearshift from the $3^{rd}$ speed to the $5^{th}$ speed is conducted by releasing the first friction clutch 25, and after the first friction clutch 25 is released, by releasing the hub sleeve 9 from the gear 35, so as to connect it to the gear 39 directly. After the hub sleeve 9 is connected to the gear 35 directly, the first friction clutch 25 is closed, thereby completing the gearshift. The torque transmission route of the engine 1 under the $5^{th}$ speed condition is, as shown by an arrow of solid line: i.e., the engine output shaft 19→the gear 20→the gear 21→the first friction clutch 25→the first input shaft 23→the hub sleeve 9→the gear 39→the gear 40→the output shaft 27. In this manner, while the first friction clutch 25 is released, the hub sleeve 9 is changed from the one gear train (i.e., the gears 35 and 36) to the other gear train (i.e., the gears 39 and 40), and such the transmission method is same to that of the conventional MT (Manual Transmission) or an automatic MT (automatic Manual Transmission). However, the first input shaft rotating speed "Ni1" is changed abruptly, when the hub sleeve 9 is connected to the gear 39 directly, therefore in the same manner in the case explained in the FIG. 14, there is the problem that the synchronizer 10 is worn down remarkably. Then, according to the present invention, the rotating speed "Ni1" of the first input shaft 23 is controlled by means of the first motor 29, thereby preventing the synchronizer 10 from the wear-out thereof, when the hub sleeve 10 is connected to the gear 39 directly. FIG. 16 is a time chart for showing the control method in a case when shifting the gears from the 3$^{rd}$ speed to the 5$^{th}$ speed. This FIG. 16 shows the "time" on the horizontal axis, while on the veridical axis thereof, the gear-shift command "Ss", the acceleration pedal depression amount "α", the first input shaft dog clutch position "DPOS1", the engine torque "Te", the first input shaft rotating speed "Ni1", the vehicle speed "Vsp", the first friction clutch torque "Tc1", the second friction clutch torque "Tc2", the first motor torque "Tm1", the second motor torque "Tm2 ", and the output shaft torque "To", respectively. Also, the engine rotating speed "Ne" is indicated by the broken line while the second input shaft rotating speed "Ni2" by the one-dotted chain line, in addition to the chart of the first input shaft rotating speed "Ni1", and regarding the first motor torque "Tm1" and the first input shaft rotating speed "Ni1", they are depicted by the solid lines when conducting the control by means of the motor while by the dotted lines when not (i.e., without the control). At the pint "a" in the figure, when the acceleration pedal depression amount "α" is lowered, and when the target drive shaft torque "TTqOut" is lowered, the gear-shift command "Ss" is changed, so that the transmission control from the 3$^{rd}$ speed to the 5$^{th}$ speed begins, therefore, the first friction clutch torque "Tc1" and the engine torque "Te" go down, gradually. At the point "b" in the figure, when the first friction clutch 25 is released if the first friction clutch torque "Tc1" comes down to zero (0), the hub sleeve 9 begins to be released from the gear 35. At the point "c" in the figure, when the dog clutch position "DCPOS1" of the first input shaft 23 is in the neutral position if the hub sleeve 9 is released, completely, the first input shaft rotating speed "Ni1" begins to go down, as shown by the dotted line in the figure. In this instance, since the first input shaft is almost in the condition of no load, the first input shaft rotating speed "Ni1" goes down slowly. Thereafter, at the point "d" in the figure, when the hub sleeve 9 begins to be connected to the gear 39, the first input shaft rotating speed "Ni1" changes due to the synchronizer 12, and at the point "e" in the figure, the hub sleeve 9 is directly connected to the gear 39, completely. After the hub sleeve 9 is directly connected to the gear 39, the first friction clutch 25 is closed gradually, and the transmission control is completed at the point "f" in the figure. However, in the similar manner as explained in the above FIG. 14, when the hub sleeve 9 is connected to the gear 39 directly, the first input shaft rotating speed "Ni1" is changed abruptly, due to the synchronizer 12, therefore there occurs the problem that the synchronizer 12 is worn down remarkably. Therefore, between the points "c" and "d" in the figure, the rotating speed of the first input shaft 23 is controlled by means of the first motor 29. In this instance, the first motor torque "Tm1" is determined by the following equation (15):

$$Tm1=(Ii1+Im1)\times(\Delta Ni1/\Delta t) \quad (15)$$

where "Ii1" indicates the inertia of the first input shaft 23, "Im1" the inertia of the first motor 29, "ΔNi1" the change in the first input shaft rotating speed "Ni", and "Δt" the time during when the first input shaft rotating speed "Ni1" is controlled, respectively. At the point "d" in the figure, when the first input shaft rotating speed "Ni1" reaches to a predetermined value, the hub sleeve 9 begins to be connected to the gear 39, and at the point "e" in the figure, it is directly connected thereto, completely. Also, it is preferable to determine the target value of the rotating speed control of the first input shaft 23, at the value indicted by the following equation (16):

$$Ni1\_ref=No\times G5 \quad (16)$$

where, "No" indicates the rotating speed of the output shaft 27, and "G5" the transmission ratio at the 5$^{th}$ speed. Determining by the equation (16) mentioned above allows to suppress the change in the first input shaft rotating speed "Ni1" when the hub sleeve 9 is directly connected to the gear 39, thereby enabling reduction of the wear-out of the synchronizer 12. Further, the rotating speed control mentioned above can be also achieved by using the second motor, in the similar manner, even in the case where the gear train on the second input shaft 24 is changed by the hub sleeves 6 and 14, and it is also applicable to all of the transmission patterns without such the clutch-to-clutch control.

Figure 17:
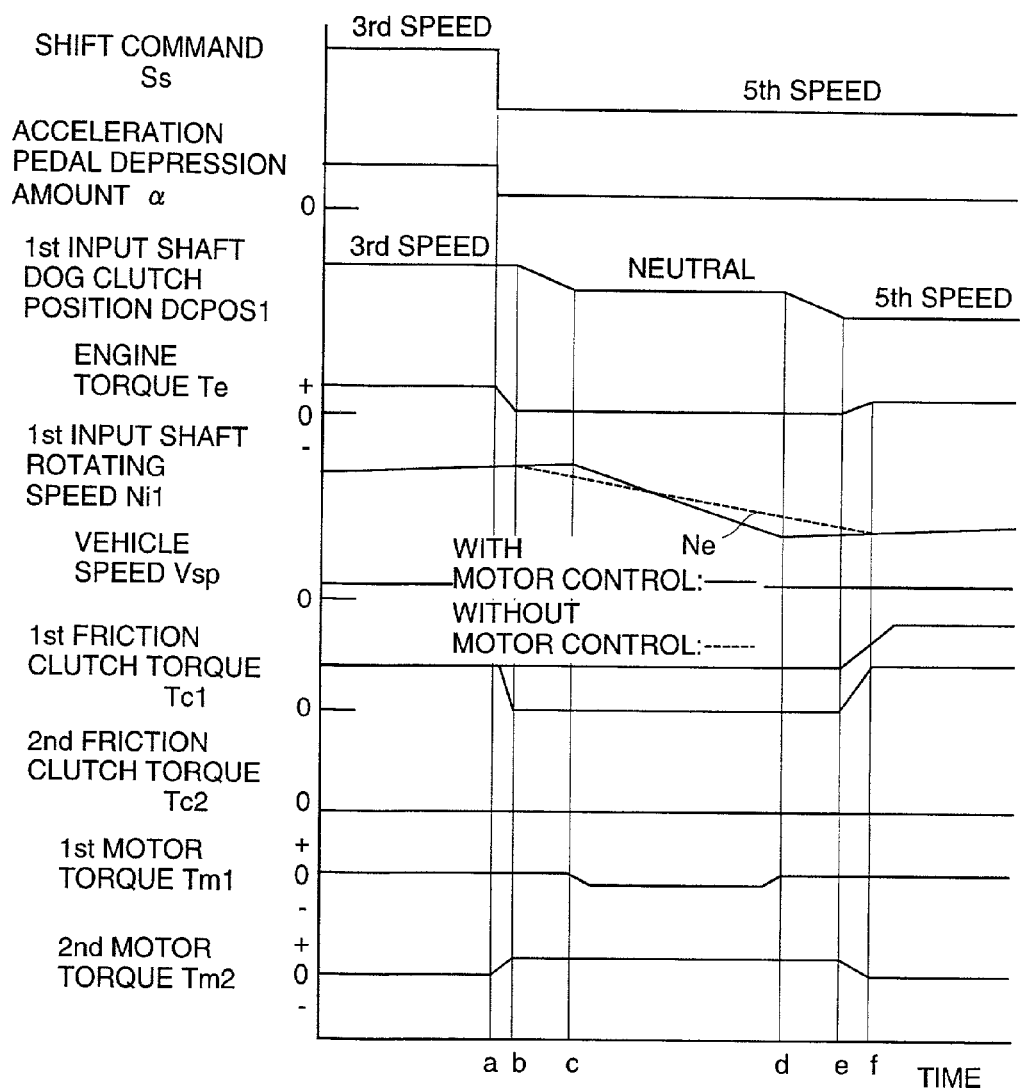
FIG. 17 shows a time chart of a torque compensation control, in particular, when changing over the dog clutch shown in FIG. 1.

FIG. 17 is a time chart for showing another control method, in particular, when shifting gears from the 3$^{rd}$ speed to the 5$^{th}$ speed. The vertical and the horizontal axes are same to those on the time chart shown in the FIG. 16, and the running condition is also same to that shown in the FIG. 16. After the shift command "Ss" is changed (at the point "a"), when the pushing force on the first friction clutch 25 is decreased down, the output shaft torque "To_a'" between the points "a" and "b" can be expressed by the following equation (17), as shown by the dotted line in the figure.

$$To\_a'=G3\times Tc1 \quad (17)$$

Assuming that "Te" is the engine torque after the gear-shift, which is estimated from the target drive shaft torque "TTqOut", the output torque after the gearshift "To_f" is as the following equation (18).

$$To\_f'=G5\times Te' \quad (18)$$

Accordingly, the torque "Tm2" of the second motor between the points "a" and "b" is determined to be as indicated by the following equations (19) and (20).

(i) when $G3\times Tc1>G5\times Te'$: $Tm2=0$ (19)

(ii) when $G3\times Tc1\leq G5\times Te'$: $Tm2=(To\_a'-To\_f)/G2=(G5\times Te'-G3\times Tc1)/G2$ (20)

Also, when the first clutch 25 is released, since the torque of the engine comes to not be transmitted to the output shaft 27 as shown by the dotted line in the figure, the torque "Tm2" of the second motor 30 is determined to be indicated by the following equation (21) between the points "b" and "e".

$$Tm2=G5\times Te'/G2 \quad (21)$$

Further, between the points "e" and "f" where the released first clutch 25 is closed gradually, the torque of the output shaft 27 comes to the following equation (22), as shown by the dotted line in the figure.

$$To\_e'=G5\times Tc1 \quad (22)$$

Therefore, the torque of the second motor 30 is determined to be that indicated by the following equation (23), thereby compensating or adjusting the torque reduction on the output shaft 27.

$$Tm2=(To\_f'-To\_e')/G2=G5\times(Te'-Tc1)/G2 \quad (23)$$

From those equations (17)–(23) mentioned above, the output shaft torque "To", when conducting the control by means of the second motor 30, can be expressed by the following equations (24) and (25).

(i) when $G3 \times Tc1 > G5 \times Te'$: $To = G3 \times Tc1$ (24)

(ii) when $G3 \times Tc1 \leq G5 \times Te'$: $To = G3 \times Tc1 + G2 \times Tm2 = G5 \times Te'$ (25)

As is apparent from those equations (24) and (25), it is possible to lower the output shaft torque "To" gradually, between the points "a" and "b", and to compensate or adjust the torque reduction on the output shaft 27, between the points "b" and "f". Also, since plural numbers of transmission stages are provided between the motor (i.e., the second motor 30) for use in the transmission control and the output shaft, the maximum torque can be made small, comparing to that described in Japanese Patent Laying-Open No. Hei 11-313404 (1999) mentioned previously, therefore it is possible to reduce the sizes and to lighten the weights of the motors, thereby enabling the reduction of the fuel consumption. Further, the compensation control for torque reduction, due to the motor(s) mentioned above can be also achieved by using the first motor, in the similar manner, even when the gear train on the second input shaft 24 is changed by the hub sleeves 6 and 14, and it is applicable to all the transmission patterns without the clutch-to-clutch control.

Figure 18:
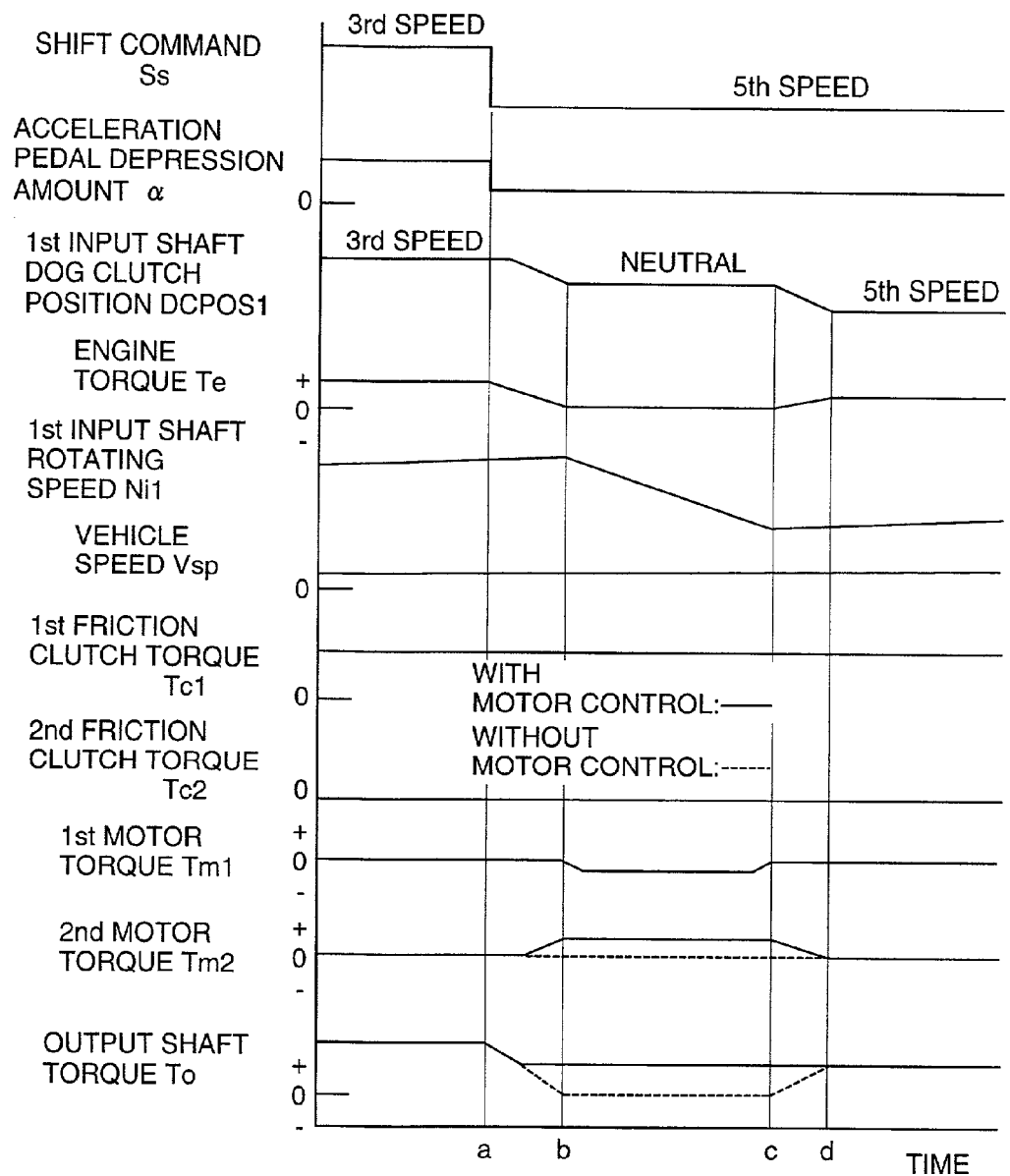
FIG. 18 shows a time chart of another torque compensation control, in particular, when changing over the dog clutch shown in FIG. 1.

FIG. 18 is a time chart for showing a control method, in particular, when shifting the gears from the $3^{rd}$ speed to the $5^{th}$ speed, but without releasing the first friction clutch 25. The vertical and the horizontal axes are same to those on the time chart shown in those FIGS. 16 and 17, and the running condition is also same to that shown in those FIGS. 16 and 17. After the shift command "Ss" is changed (at the point "a"), in the same manner as shown in the FIG. 17, the engine torque "Te" is reduced down, temporally, for performing the gearshift by changing the hub sleeve 9 from the gear 35 to the gear 39. This is because, when the torque is generated onto the hub sleeve 9, it is difficult to release the hub sleeve 9 from the gear 35. Also, when the hub sleeve 9 is released from the gear 35, the first motor torque "Tm1" is reduced, and in the similar manner shown in the FIG. 16, the rotating speed of the first input shaft 23 is controlled, thereby to perform the gearshift to the gear 39. In the gearshift mentioned above, as shown by the dotted line in the figure, since the torque transmission from the engine 1 to the output shaft 27 is interrupted or cut off, the torque of the second motor rises up as shown by the solid line in the figure, thereby compensating the torque reduction on the output shaft 27. Since the frequency of the increase in the second motor torque is only during the gearshift, the influence upon the fuel efficiency or mileage is very small. Between the points "a" and "b", by taking the time "td3" when the hub sleeve 9 is released from the gear 35 into the consideration, a rise-up time "tm2_u" for the torque of the second motor 30 is determined by a function "g" as shown by the following equation (26), and the torque of the second motor 30 is increased up to the value indicated by the following equation (27):

$tm2\_u = g(td3)$ (26)

$Tm2 = G5 \times Te'/G2$ (27)

where, "Te1" is the engine torque after the gearshift, which is estimated from the target drive shaft torque "TTqOut", and "G5" the transmission ratio at the $5^{th}$ speed. Between the points "b" and "c" in the figure, the value of the second motor torque "Tm2" indicated by the above equation (27) is maintained as it is, thereby compensating or adjusting the torque reduction on the output shaft 27 during the gearshift. Between the points "c" and "d" in the figure, by taking the time "td5" for the hub sleeve 9 to contact with the gear 39 into the consideration, the rise-up time "tm2_d" for the torque of the second motor 30 is determined by a function "h" as shown by the following equation (28), thereby reducing the torque of the second motor 30 down to zero (0).

$tm2\_d = h(td5)$ (28)

As was explained in the above, with controlling the second motor 30 following those equations (26)–(28) mentioned above, during the gearshift, it is possible to compensate the torque reduction during the gearshift. Also, in the same manner as explained in the FIG. 17, since there are provided plural numbers of the transmission stages between the motor for use in the transmission control (i.e., the second motor 30) and the output shaft, the maximum torque of the motor can be made small, comparing to the case where the motor(s) is/are connected to the output shaft, thereby enabling the small-sizing and weight-lightening of the motors, as well as, the reduction of the fuel efficiency or mileage. Further, the compensation control for torque reduction by means of the motors mentioned above can be also achieved by using the first motor, in the similar manner, even when changing the gear train on the second input shaft 24 by the hub sleeves 6 and 14, and it is applicable to all the transmission patterns without the clutch-to-clutch control.

Figure 19:
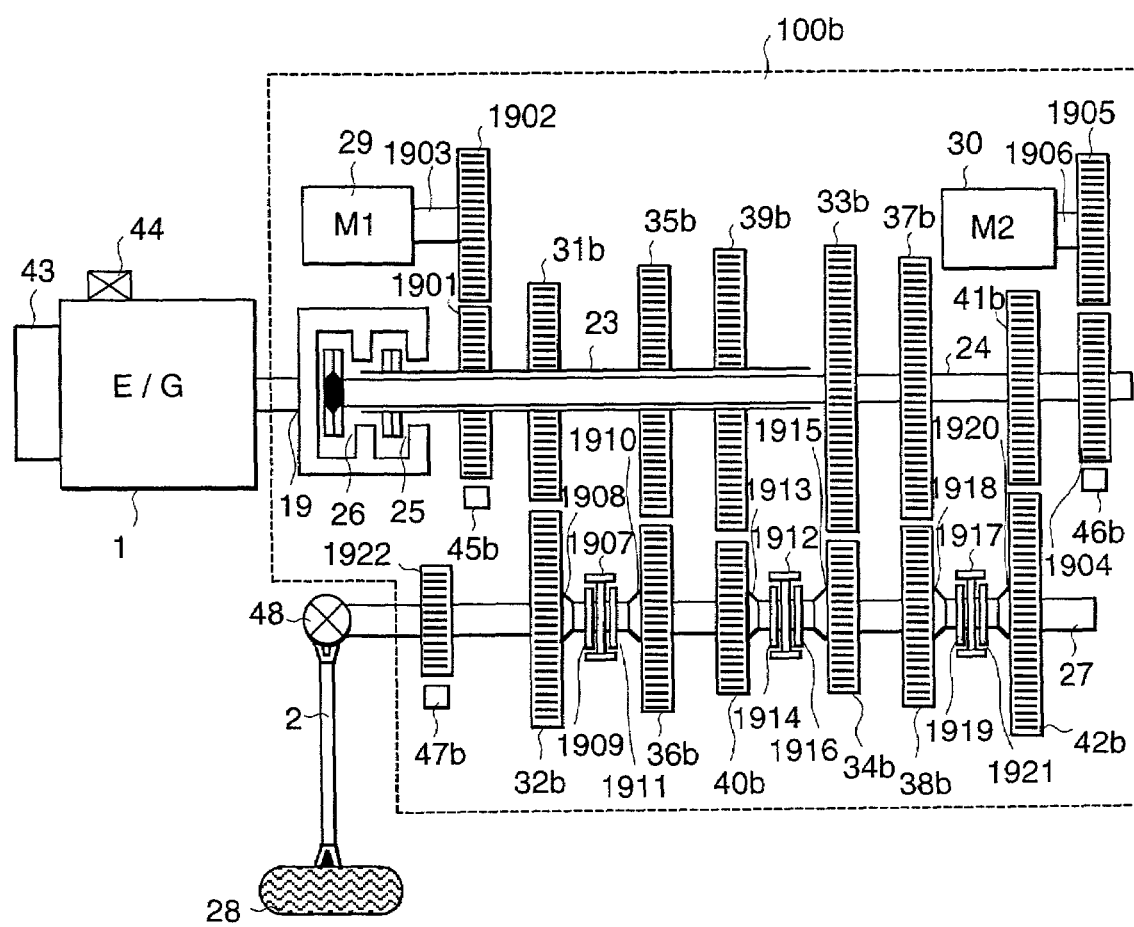
FIG. 19 is the structure view of the automobile system, according to another embodiment of the present invention.

FIG. 19 shows the structure of an automobile system, according to another embodiment of the present invention.

Onto the engine 1 are attached an electric control throttle 43 for controlling an amount of suction air and an engine rotating speed sensor 44 for measuring the engine rotating speed "Ne".

Between the engine output shaft 19 and the first input shaft 23 of a gear-type transmission 100b is provided the first friction clutch 25, so as to transmit the motive power of the engine 1 to the first input shaft 23. In the similar manner, between the engine output shaft 19 and the second input shaft 24 of the gear-type transmission 100b is provide the second friction clutch 26, so as to transmit the motive power of the engine 1 to the second input shaft 24. Also, the first input shaft 23 has the cylindrical structure, and the second input shaft 24 has such the structure that it passes through the hollow portion of the first input shaft 23 mentioned above, therefore the first input shaft 23 is supported freely ratatable to the second input shaft.

To the first input shaft 23 are attached gears 1901, 31b, 35b and 39b in one body, in which the gear 1901 is also used as a detector of the first input shaft rotating speed "Ni1", and detection of rotation of the gear 1901 by a sensor 45a enables the detection of the rotating speed of the first input shaft 23. Also, to the second input shaft 24 are attached gears 1904, 33b, 37b and 41b in one body, in which the gear 1904 is also used as a detector of the second input shaft rotating speed "Ni2", and detection of rotation of the gear 1904 by a sensor 46a enables the detection of the rotating speed of the second input shaft 24.

Onto a first motor output shaft 1903 is attached a gear 1902. The gear 1902 is always meshed with the gear 1901 mentioned above, and then it is possible to transmit the torque of the first motor 29 to the first input shaft 23 mentioned above.

Onto a second motor output shaft 1906 is attached a gear 1905. The gear 1905 is always meshed with the gear 1904 mentioned above, and then it is possible to transmit the torque of the second motor 30 to the second input shaft 24 mentioned above.

On the output shaft 27 are mounted: a gear 1922, a gear 32b equipped with a contact gear 1908 and a synchronizer 1909, a gear 36b equipped with a contact gear 1910 and a synchronizer 1911, a gear 40b equipped with a contact gear 1913 and a synchronizer 1914, a gear 34b equipped with a contact gear 1915 and a synchronizer 1916, a gear 38b equipped with a contact gear 1918 and a synchronizer 1919, a gear 42b equipped with a contact gear 1920 and a synchronizer 1921, a hub sleeve 1907 for directly connecting between the output shaft 27 and the gear 32b or the gear 36b, a hub sleeve 1912 for directly connecting between the output shaft 27 and the gear 40b or the gear 34b, and a hub sleeve 1917 for directly connecting between the output shaft 27 and the gear 328b or the gear 42b, being freely rotatable to the output shaft 27. The gear 1922 is also used as a detector of the output shaft rotating speed "No", and detection of the rotation of the gear 1922 by the sensor 47b enables the detection of the rotating speed of the output shaft 27. On the gears 32b, 36b, 40b, 34b, 38b and 42b are provide stoppers (not shown in the figure), for preventing them from moving in the axial direction of the output shaft 27. And, in an inside of the hub sleeves 1907, 1912 and 1917 are formed gutters (not shown in the figure) to be meshed with plural numbers of gutters of the output shaft 27, so that the hub sleeves 1907, 1912 and 1917 are engaged with the output shaft 27, being allowed to make a relative movement in the axial direction of the output shaft 27, but restricted from a movement in the rotational direction thereof. Accordingly, the torque transferred to the hub sleeves 1907, 1912 and 1917 mentioned above can be transmitted to the output shaft 27.

For transmitting the torque from the hub sleeve 32b or the gear 36b to the hub sleeve 1907, it is necessary to move the hub sleeve 1907 into the axial direction of the output shaft 27, thereby to contact the hub sleeve 1907 and the gear 32b or 36b directly, through the synchronizer 1909 and the contact gear 1908, or through the synchronizer 1911 and the contact gear 1910. In the similar manner, for transmitting the torque from the gear 40b or 34b to the hub sleeve 1912, it is necessary to move the hub sleeve 1912 into the axial direction of the output shaft 27, thereby to connect the hub sleeve 1912 and the gear 40b or 34b directly, through the synchronizer 1914 and the contact gear 1913, or through the synchronizer 1916 and the contact gear 1915. And, also for transmitting the torque from the gear 38b or 42b to the hub sleeve 1917, it is necessary to move the hub sleeve 1917 into the axial direction of the output shaft 27, thereby to contact the hub sleeve 1917 and the gear 38b or 42b directly, through the synchronizer 1919 and the contact gear 1918, or through the synchronizer 1921 and the contact gear 1920.

Onto the output shaft 27 mentioned above is connected the differential apparatus 28, and the torque on the output shaft 27 is transmitted through the differential apparatus 28 and the vehicle driving shaft 2 to the wheels (or tires) 48.

In the embodiment of the present invention shown in FIG. 19, it is assumed that, the gear train made up from the gears 31b and 32b is the $1^{st}$ speed, that from the gears 41b and 42b the $2^{nd}$ speed, that from the gears 35b and 36b the $3^{rd}$ speed, that from the gears 37b and 38b the $4^{th}$ speed, that from the gears 39 and 40 the $5^{th}$ speed, and that from the gears 33b and 34b the $6^{th}$ speed, respectively, in the transmission steps.

With the hollow structure of one of those two (2) input shafts, in this manner, it is possible to make the transmission small in the sizes thereof. And also, the dog clutches can be reduced in the number thereof, therefore low cost can be achieved for the motive force transmission system.

Figure 20:
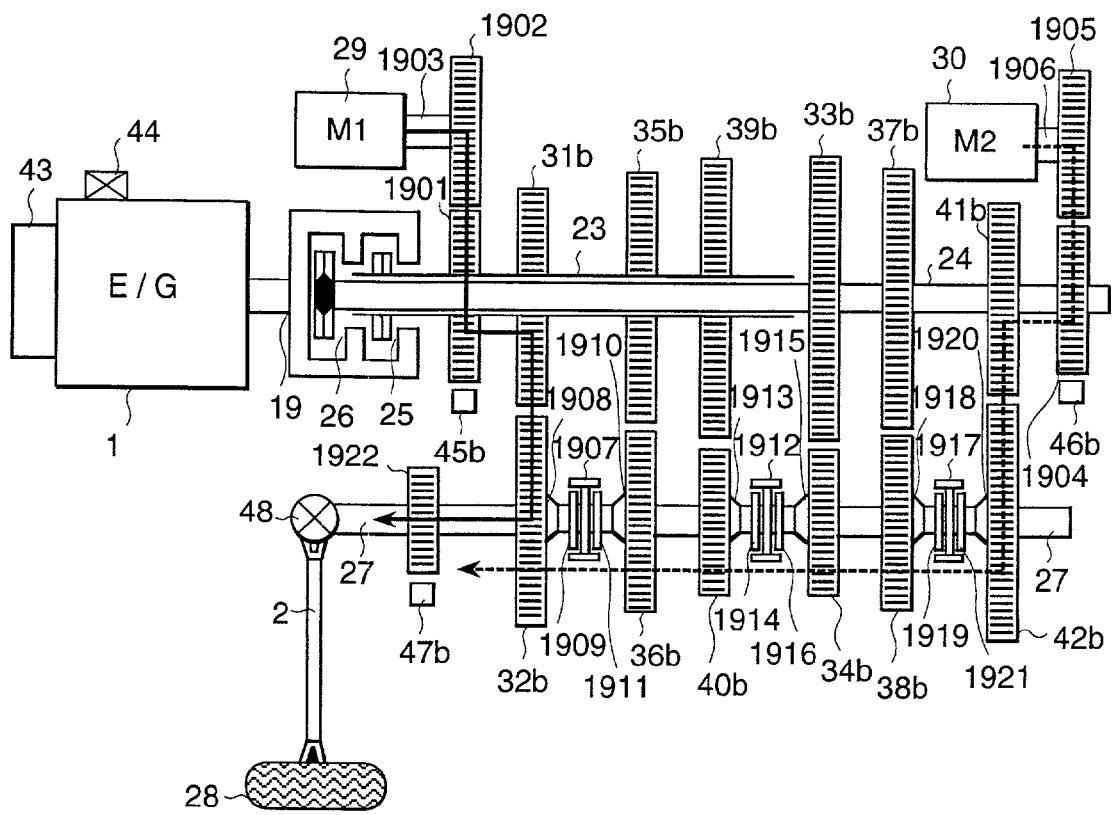
FIG. 20 shows operation principle of the embodiment show in FIG. 19, in particular, under the motor running mode.

Next, an example of an operation mode of the system shown in the FIG. 19 will be shown, by referring to FIG. 20.

In FIG. 20 is shown the torque transmission route under the motor running mode. In this case, the first friction clutch 25 is released while the hub sleeve 1907 is connected to the gear 32b directly, so as to set the transmission ratio of the gear-type transmission 100b at the $1^{st}$ speed, thereby traveling with the driving power of the engine 1. In this instance, the torque transmission route of the first motor 29 is, as shown by the solid line in the figure: i.e., the first motor output shaft 1903→the gear 1902→the gear 1901→the first input shaft 23→the gear 31b→the gear 32b→the hub sleeve 1907→the output shaft 27. However, it may be possible to set the transmission ratio of the gear-type transmission 100b at the $3^{rd}$ speed or the $5^{th}$ speed to travel, with connecting the hub sleeve 1907 to the gear 36b, or connecting the hub sleeve 1912 to the gear 40b, directly. It is also possible to release the second friction clutch 26 while connecting the hub sleeve 1917 to the gear 42b directly, so as to set the transmission ratio of the gear-type transmission 100b at the $2^{nd}$ speed, thereby traveling with the driving power of the second motor 30. In this instance, the torque transmission route of the second motor 30 is, as shown by the dotted line in the figure: i.e., the second motor output shaft 1906→the gear 1905→the gear 1904→the second input shaft 24→the gear 41b→the gear 42b→the hub sleeve 1917→the output shaft 27. However, it may be possible to set the transmission ratio of the gear-type transmission 100b at the $4^{th}$ speed or the $6^{th}$ speed to travel, with connecting the hub sleeve 1917 to the gear 38b, or connecting the hub sleeve 1912 to the gear 34b, directly. Further, when the target drive shaft torque "TTqOut" is large, it is possible to travel with driving the first motor 29 and the second motor 30, simultaneously. In this instance, it is preferable to bring both the first friction clutch 25 and the second friction clutch 26 into the released condition, so as to prevent from interference in the torques with each other between the first motor 29 and the second motor 30.

In the above, though the explanation was made on the motor running mode by referring to the FIG. 20, as an example of the operation principle of the system shown in the FIG. 19, however also the alternator mode, the charge while stopping mode, the series mode, the series/parallel common mode can be achieved with the system shown in the FIG. 19, and further can be also achieved the motor controls when shifting the gear and when preparing the gear shift, which was shown in the FIGS. 11-18, in the similar manner.

As was fully explained in the above, according to the present invention, with a power transmission apparatus for use in an automobile, comprising: (a) an engine; a gear-type transmission having: (b1) a first input shaft to which motive power is transmitted from said engine through a first friction clutch; (b2) a second input shaft to which motive power is transmitted from said engine through a second friction clutch; (b3) plural numbers of gear trains provided between said first input shaft and an output shaft and between said second input shaft and said output shaft; and (b4) a claw clutch provided on said gear trains; (c) a first motor connected to said first input shaft; and (d) a second motor connected to said second input shaft, since various driving modes can be realized, as well as, the small-sizing of the motors, thereby enabling to establish and/or satisfy both the reduction of fuel efficiency (or , mileage) and the drivability due to the small-sizing and the weight-lightening of the power transmission apparatus.

What is claimed is:

1. A control unit for a power transmission apparatus for use in an automobile comprising:
(a) an engine;
(b) a gear-type transmission having: (b1) a first input shaft to which power is transmitted from said engine through a first friction clutch; (b2) a second input shaft to which motive power is transmitted from said engine through a second friction clutch; (b3) a plurality of gear trains provided between said first input shaft and an output shaft and between said second input shaft and said output shaft; and (b4) a claw clutch provided on said gear trains;
(c) a first motor connected to said first input shaft; and
(d) a second motor connected to said second input shaft, wherein,
said control unit is configured to control said first or second motor so as to suppress a thrust or push-up on torque of said output shaft due to inertia torque after torque transmitted by said second friction clutch coincides substantially with output shaft torque of said engine in conducting a gear-shift through a change-over from said first friction clutch to said second friction clutch.

2. A control unit as described in claim 1, wherein either one of said first motor or said second motor is driven so that wear-out of said claw clutch is suppressed by controlling a rotating speed of either one of said first input shaft and said second input shaft, when conducting gear-shift through change-over of said gear trains with said claw clutch.

3. A control unit as described in claim 1, wherein said first or second motor is driven so as to absorb torque from said output shaft when up-shifting.

4. A control unit as described in claim 1, wherein said first or second motor is driven so as to supply torque to said output shaft when up-shifting.

5. A control unit for a power transmission apparatus for use in an automobile, comprising:
(a) an engine;
(b) a gear-type transmission having: (b1) a first input shaft to which power is transmitted from said engine through a first friction clutch; (b2) a second input shaft to which power is transmitted from said engine through a second friction clutch; (b3) a plurality of gear trains provided between said first input shaft and an output shaft and between said second input shaft and said output shaft; and (b4) a claw clutch provided on said gear trains;
(c) a first motor connected to said first input shaft; and
(d) a second motor connected to said second input shaft,
said control unit is configured to control either one of said first motor and said second motor so that a drawn or pull-in on said output shaft is suppressed after an increase in a pressing force upon said second friction clutch starts in conducting gear-shift through change-over from said first friction clutch to said second friction clutch.

6. A control unit as described in claim 5, wherein either one of said first motor or said second motor is driven so that wear-out of said claw clutch is suppressed by controlling a rotating speed of either one of said first input shaft and said second input shaft, when conducting gear-shift through change-over of said gear trains with said claw clutch.

* * * * *